United States Patent
Palin et al.

(10) Patent No.: US 9,820,132 B2
(45) Date of Patent: Nov. 14, 2017

(54) WIRELESS SHORT-RANGE DISCOVERY AND CONNECTION SETUP USING FIRST AND SECOND WIRELESS CARRIER

(71) Applicant: Nokia Corporation, Espoo (FI)

(72) Inventors: Arto Palin, Viiala (FI); Jukka Reunamaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/556,531

(22) Filed: Dec. 1, 2014

(65) Prior Publication Data

US 2016/0157078 A1 Jun. 2, 2016

(51) Int. Cl.
| | |
|---|---|
| H04W 8/00 | (2009.01) |
| H04W 68/02 | (2009.01) |
| H04W 76/02 | (2009.01) |
| H04W 4/00 | (2009.01) |
| H04L 29/12 | (2006.01) |

(52) U.S. Cl.
CPC .......... *H04W 8/005* (2013.01); *H04W 4/008* (2013.01); *H04W 68/02* (2013.01); *H04W 76/023* (2013.01); *H04L 61/6004* (2013.01); *H04L 61/6022* (2013.01)

(58) Field of Classification Search
CPC ... H04W 76/02; H04W 48/16; H04W 76/025; H04W 4/008; H04W 76/023; H04M 1/7253; H04M 2250/02
See application file for complete search history.

(56) References Cited

U.S. PATENT DOCUMENTS

| | | |
|---|---|---|
| 5,638,443 A | 6/1997 | Stefik et al. |
| 6,199,076 B1 | 3/2001 | Logan et al. |
| 6,226,618 B1 | 5/2001 | Downs et al. |

(Continued)

FOREIGN PATENT DOCUMENTS

| | | |
|---|---|---|
| EP | 1187504 | 3/2002 |
| EP | 2015274 | 1/2009 |

(Continued)

OTHER PUBLICATIONS

Random Device Address, Bluetooth™ Core Specification, Version 4.1 [vol. 3] Part C, Section 10.8.2.3, pp. 383-386, Dec. 3, 2013.

(Continued)

*Primary Examiner* — Devan Sandiford
(74) *Attorney, Agent, or Firm* — Locke Lord LLP

(57) ABSTRACT

In an example embodiment, a method includes establishing, by an apparatus, pairing with another wireless device to establish a secure relationship with the other device over a first wireless carrier and transmitting a device address of the apparatus associated with the secure relationship over the first wireless carrier; receiving, by the apparatus, wireless paging messages over a second wireless carrier from the other wireless device, the wireless paging messages being addressed to the apparatus using the device address associated with the secure relationship transmitted over the first wireless carrier; and exchanging, by the apparatus, paging response messages over the second wireless carrier with the other wireless device, and establishing a wireless connection over the second wireless carrier with the other wireless device.

22 Claims, 17 Drawing Sheets

(56) References Cited

U.S. PATENT DOCUMENTS

| | | |
|---|---|---|
| 6,233,684 B1 | 5/2001 | Stefik et al. |
| 6,385,596 B1 | 5/2002 | Wiser et al. |
| 6,974,076 B1 | 12/2005 | Siegel |
| 9,158,395 B2 | 10/2015 | Park et al. |
| 2004/0042413 A1 | 3/2004 | Kawamura et al. |
| 2004/0133794 A1 | 7/2004 | Kocher et al. |
| 2004/0215816 A1 | 10/2004 | Hayes et al. |
| 2005/0004873 A1 | 1/2005 | Pou et al. |
| 2005/0278646 A1 | 12/2005 | Liscano et al. |
| 2006/0240777 A1 | 10/2006 | Ruuska |
| 2006/0253424 A1 | 11/2006 | Huang |
| 2006/0267794 A1 | 11/2006 | Lee et al. |
| 2007/0206660 A1 | 9/2007 | Lifchuk |
| 2008/0013502 A1 | 1/2008 | Clark |
| 2008/0161026 A1 | 7/2008 | Wiatrowski et al. |
| 2009/0254975 A1 | 10/2009 | Turnbull et al. |
| 2009/0320098 A1 | 12/2009 | Roberts et al. |
| 2010/0058377 A1 | 3/2010 | Grob et al. |
| 2010/0079607 A1* | 4/2010 | Won ................... G08C 17/02 348/211.2 |
| 2010/0105409 A1 | 4/2010 | Agarwal et al. |
| 2010/0118736 A1 | 5/2010 | Chung et al. |
| 2010/0317289 A1* | 12/2010 | Desai ................... H04B 17/318 455/41.2 |
| 2011/0021142 A1* | 1/2011 | Desai ................... H04W 8/005 455/41.2 |
| 2011/0066850 A1 | 3/2011 | Ekberg |
| 2011/0103428 A1 | 5/2011 | Chan |
| 2011/0219427 A1 | 9/2011 | Hito et al. |
| 2011/0293098 A1 | 12/2011 | Fu et al. |
| 2011/0319020 A1* | 12/2011 | Desai ................... H04L 63/02 455/41.2 |
| 2012/0005311 A1 | 1/2012 | Livingston et al. |
| 2012/0068921 A1* | 3/2012 | Jacobsen ............. G06F 3/012 345/156 |
| 2012/0295587 A1 | 11/2012 | Paya et al. |
| 2013/0065584 A1 | 3/2013 | Lyon et al. |
| 2013/0067552 A1 | 3/2013 | Hawkes et al. |
| 2013/0090061 A1* | 4/2013 | Linde ................... H04W 8/005 455/41.2 |
| 2013/0109315 A1* | 5/2013 | Polo ................... H04W 52/0274 455/41.2 |
| 2013/0138786 A1 | 5/2013 | Ji et al. |
| 2013/0188538 A1* | 7/2013 | Kainulainen ............. G01S 3/48 370/310 |
| 2014/0018002 A1* | 1/2014 | Jose ................... H04W 4/008 455/41.2 |
| 2014/0073244 A1* | 3/2014 | Ko ................... H04W 76/023 455/41.1 |
| 2014/0302849 A1* | 10/2014 | Palin ................... H04W 8/005 455/436 |
| 2014/0315491 A1* | 10/2014 | Preiszler ............. H04W 76/025 455/41.2 |
| 2014/0355517 A1* | 12/2014 | Reunamaki ........... H04W 8/005 370/328 |
| 2014/0370811 A1* | 12/2014 | Kang .................... H04W 84/18 455/41.2 |
| 2014/0380159 A1 | 12/2014 | Reilly et al. |
| 2015/0126117 A1* | 5/2015 | Wong ................ H04W 52/0229 455/41.2 |
| 2015/0135087 A1 | 5/2015 | Verkasalo |
| 2015/0193198 A1 | 7/2015 | Hutchings et al. |
| 2015/0256954 A1 | 9/2015 | Carlsson et al. |
| 2015/0296329 A1* | 10/2015 | Mao ....................... H04W 4/008 370/338 |
| 2015/0304209 A1 | 10/2015 | Choudhury et al. |
| 2015/0341876 A1 | 11/2015 | Abraham et al. |
| 2015/0365999 A1* | 12/2015 | Lee ....................... H04W 80/02 381/315 |
| 2015/0373083 A1 | 12/2015 | Geurts et al. |
| 2016/0072573 A1 | 3/2016 | Tohzaka et al. |
| 2016/0072855 A1* | 3/2016 | Palin ................... H04L 65/1069 709/219 |

FOREIGN PATENT DOCUMENTS

| | | |
|---|---|---|
| EP | 1418781 | 6/2012 |
| KR | 20110032370 | 3/2011 |
| WO | WO2005091573 | 9/2005 |

OTHER PUBLICATIONS

Pairing Methods and Security in Bluetooth Low Energy, Bluetooth™ Core Specification, Version 4.1 [vol. 3], Part H Sections 2.3 and 2.4, pp. 613-629, Dec. 3, 2013.
Encryption Procedure, Bluetooth™ Core Specification, Version 4.1 [vol. 6] Part B, Section 5.1.3, pp. 87-90, Dec. 3, 2013.
Security Aspects-LE Physical Transport, Bluetooth™ Core Specification, Version 4.1 [vol. 3] [Part C], Generic Access Profile Section 10.8.2, pp. 370-386, Dec. 3, 2013.
Pairing Methods and Security in Bluetooth LE, Bluetooth™ Core Specification, Version 4.1 [vol. 3], Part H Sections 3.5 and 3.6, pp. 632-645, Dec. 3, 2013.
"Bluetooth Specification version 4.2", Bluetooth SIG, Dec. 2, 2014 (Dec. 2, 2014), XP055359393, Retrieved from the Interernet: URL:https:// www.bluetooth.com/specificatio.ns/adopted-specifications [retrieved on Mar. 28, 2017] * p. 255, paragraph 4.1.4—p. 255, paragraph 4.1.4 *.
Greg Stewart: "Can BLE advertise while being connected ?", TI E2E Community—Bluetooth low energy Forum, Nov. 20, 2014 (Nov. 20, 2014), XP002769355, Retrieved from the Internet: URL:https://e2e.ti.com/support/wireless_connectivity/bluetooth_low_energy/f/538/t/383746 [retrieved on Apr. 19, 2017] * the whole document *.
European Search Report completed Apr. 24, 2017 for Application No. EP 17 15 4094.

* cited by examiner

FIG. 5A

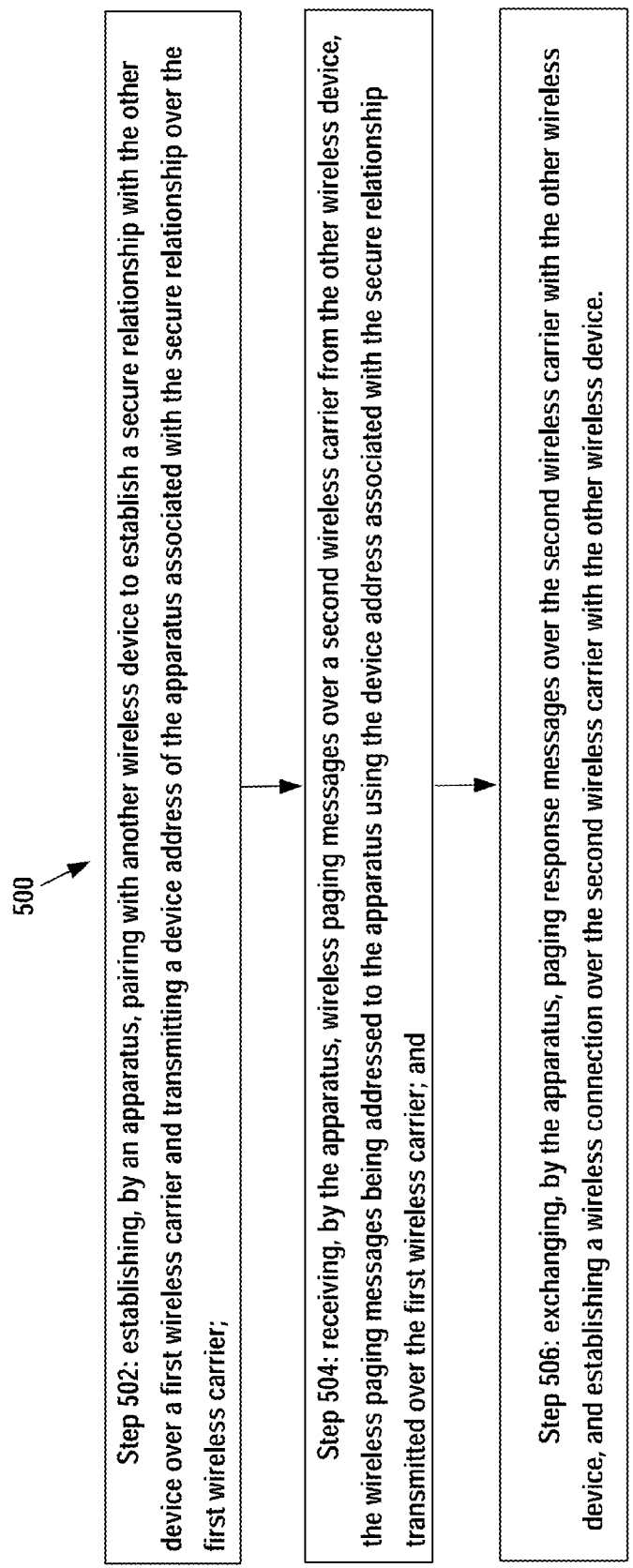

500

Step 502: establishing, by an apparatus, pairing with another wireless device to establish a secure relationship with the other device over a first wireless carrier and transmitting a device address of the apparatus associated with the secure relationship over the first wireless carrier;

Step 504: receiving, by the apparatus, wireless paging messages over a second wireless carrier from the other wireless device, the wireless paging messages being addressed to the apparatus using the device address associated with the secure relationship transmitted over the first wireless carrier; and Step 506: exchanging, by the apparatus, paging response messages over the second wireless carrier with the other wireless device, and establishing a wireless connection over the second wireless carrier with the other wireless device.

WIRELESS SHORT-RANGE DISCOVERY AND CONNECTION SETUP USING FIRST AND SECOND WIRELESS CARRIER

FIELD

The technology field relates to setting up wireless device discovery and connection setup.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. The Bluetooth™ Core Specification, Version 4.1, Bluetooth™ SIG, Dec. 3, 2013 (incorporated herein by reference), describes the Bluetooth™ protocol (BT) and the Bluetooth™ Low Energy protocol (BTLE).

SUMMARY

Method, apparatus, and computer program product example embodiments enhance wireless device discovery.

An example embodiment of the invention includes a method comprising:

establishing, by an apparatus, pairing with another wireless device to establish a secure relationship with the other device over a first wireless carrier and transmitting a device address of the apparatus associated with the secure relationship over the first wireless carrier;

receiving, by the apparatus, wireless paging messages over a second wireless carrier from the other wireless device, the wireless paging messages being addressed to the apparatus using the device address associated with the secure relationship transmitted over the first wireless carrier; and exchanging, by the apparatus, paging response messages over the second wireless carrier with the other wireless device, and establishing a wireless connection over the second wireless carrier with the other wireless device.

An example embodiment of the invention includes a method comprising:

wherein the device address of the apparatus associated with the secure relationship is a unique address of the apparatus.

An example embodiment of the invention includes a method comprising:

wherein the first wireless carrier is Bluetooth™ Low Energy protocol

An example embodiment of the invention includes a method comprising:

wherein the second wireless carrier is Bluetooth™ basic rate/enhanced data rate protocol and the wireless paging messages are Bluetooth™ basic rate/enhanced data rate paging packets.

An example embodiment of the invention includes a method comprising:

wherein the device address of the apparatus associated with the secure relationship is a 48-bit Bluetooth™ device address.

An example embodiment of the invention includes a method comprising:

requesting, by an apparatus, pairing with another wireless device to establish a secure relationship with the other device over a first wireless carrier and receiving a device address of the other device associated with the secure relationship over the first wireless carrier;

transmitting, by the apparatus, wireless paging messages over a second wireless carrier to the other wireless device, the wireless paging messages being addressed to the other device using the device address associated with the secure relationship received over the first wireless carrier; and exchanging, by the apparatus, paging response messages over the second wireless carrier with the other wireless device, and establishing a wireless connection over the second wireless carrier with the other wireless device.

An example embodiment of the invention includes a method comprising:

wherein the device address of the other device associated with the secure relationship is a unique address of the other device.

An example embodiment of the invention includes a method comprising:

wherein the first wireless carrier is Bluetooth™ Low Energy protocol

An example embodiment of the invention includes a method comprising:

wherein the second wireless carrier is Bluetooth™ basic rate/enhanced data rate protocol and the wireless paging messages are Bluetooth™ basic rate/enhanced data rate paging packets.

An example embodiment of the invention includes a method comprising:

wherein the device address of the other device associated with the secure relationship is a 48-bit Bluetooth™ device address.

An example embodiment of the invention includes an apparatus comprising:

at least one processor;

at least one memory including computer program code;

the at least one memory and the computer program code configured to, with the at least one processor, cause the apparatus at least to:

establish pairing with another wireless device to establish a secure relationship with the other device over a first wireless carrier and transmit a device address of the apparatus associated with the secure relationship over the first wireless carrier;

receive wireless paging messages over a second wireless carrier from the other wireless device, the wireless paging messages being addressed to the apparatus using the device address associated with the secure relationship transmitted over the first wireless carrier; and exchange paging response messages over the second wireless carrier with the other wireless device, and establish a wireless connection over the second wireless carrier with the other wireless device.

An example embodiment of the invention includes an apparatus comprising:

wherein the device address of the apparatus associated with the secure relationship is a unique address of the apparatus.

An example embodiment of the invention includes an apparatus comprising:

wherein the first wireless carrier is Bluetooth™ Low Energy protocol

An example embodiment of the invention includes an apparatus comprising:

wherein the second wireless carrier is Bluetooth™ basic rate/enhanced data rate protocol and the wireless paging messages are Bluetooth™ basic rate/enhanced data rate paging packets.

An example embodiment of the invention includes an apparatus comprising:

wherein the device address of the apparatus associated with the secure relationship is a 48-bit Bluetooth™ device address.

An example embodiment of the invention includes an apparatus comprising:

requesting, by an apparatus, pairing with another wireless device to establish a secure relationship with the other device over a first wireless carrier and receiving a device address of the other device associated with the secure relationship over the first wireless carrier;

transmitting, by the apparatus, wireless paging messages over a second wireless carrier to the other wireless device, the wireless paging messages being addressed to the other device using the device address associated with the secure relationship received over the first wireless carrier; and exchanging, by the apparatus, paging response messages over the second wireless carrier with the other wireless device, and establishing a wireless connection over the second wireless carrier with the other wireless device.

An example embodiment of the invention includes an apparatus comprising:

wherein the device address of the other device associated with the secure relationship is a unique address of the other device.

An example embodiment of the invention includes an apparatus comprising:

wherein the first wireless carrier is Bluetooth™ Low Energy protocol

An example embodiment of the invention includes an apparatus comprising:

wherein the second wireless carrier is Bluetooth™ basic rate/enhanced data rate protocol and the wireless paging messages are Bluetooth™ basic rate/enhanced data rate paging packets.

An example embodiment of the invention includes an apparatus comprising:

wherein the device address of the other device associated with the secure relationship is a 48-bit Bluetooth™ device address.

An example embodiment of the invention includes a computer program product comprising computer executable program code recorded on a computer readable, non-transitory storage medium, the computer executable program code comprising:

code for establishing, by an apparatus, pairing with another wireless device to establish a secure relationship with the other device over a first wireless carrier and transmitting a device address of the apparatus associated with the secure relationship over the first wireless carrier;

code for receiving, by the apparatus, wireless paging messages over a second wireless carrier from the other wireless device, the wireless paging messages being addressed to the apparatus using the device address associated with the secure relationship transmitted over the first wireless carrier; and code for exchanging, by the apparatus, paging response messages over the second wireless carrier with the other wireless device, and establishing a wireless connection over the second wireless carrier with the other wireless device.

An example embodiment of the invention includes a computer program product comprising computer executable program code recorded on a computer readable, non-transitory storage medium, the computer executable program code comprising:

code for requesting, by an apparatus, pairing with another wireless device to establish a secure relationship with the other device over a first wireless carrier and receiving a device address of the other device associated with the secure relationship over the first wireless carrier;

code for transmitting, by the apparatus, wireless paging messages over a second wireless carrier to the other wireless device, the wireless paging messages being addressed to the other device using the device address associated with the secure relationship received over the first wireless carrier; and code for exchanging, by the apparatus, paging response messages over the second wireless carrier with the other wireless device, and establishing a wireless connection over the second wireless carrier with the other wireless device.

The resulting example embodiments enhance wireless device discovery and connection setup.

DESCRIPTION OF THE FIGURES

FIG. 5A is an illustration of an example flow diagram of an example process in the mobile wireless device, carrying out the example operations, in accordance with at least one embodiment of the present invention.

DISCUSSION OF EXAMPLE EMBODIMENTS OF THE INVENTION

Figure 1A:
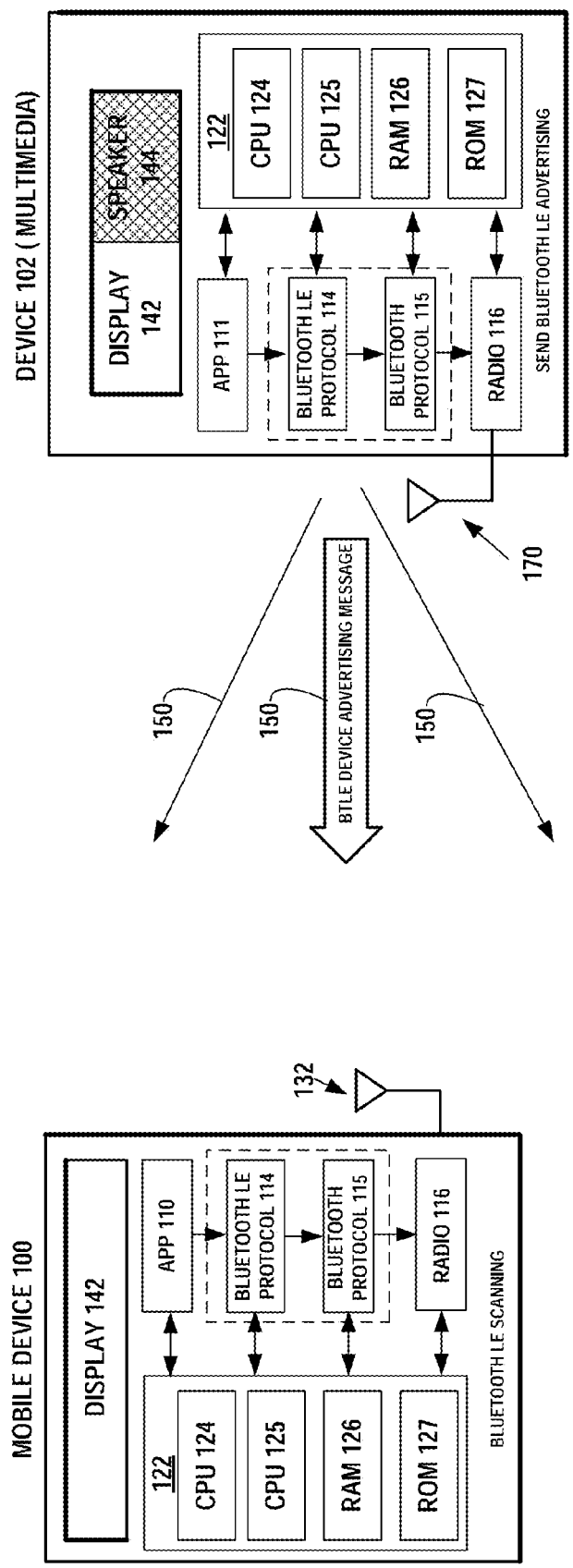
FIG. 1A is an illustration of an example embodiment of a network with an example multimedia wireless device, such as an audio speaker and/or video display, and a mobile wireless device. A multimedia wireless device includes, in accordance with at least one example embodiment, at least an individual audio speaker or display device. The mobile wireless device is shown scanning for Bluetooth™ Low Energy protocol (BTLE) advertising messages. The multimedia wireless device is shown transmitting BTLE advertising messages containing a description of the multimedia wireless device capabilities. When the multimedia wireless device in the advertising state, enters the connection state, it will be in the slave role and the mobile wireless device will be in the master role in a BTLE data channel, in accordance with at least one embodiment of the present invention.

This section is organized into the following topics:
A. Wireless Short-Range Communication Networks
B. Connection Formation Between Bluetooth™ Devices
C. Bluetooth™ Low Energy (LE) Technology
D. Method for Device Discovery
A. Wireless Short-Range Communication Networks Short-range communication technologies provide communication solutions appropriate for many data applications, without the cost, traffic and legislative concerns of longer-range communication technologies. Popular short-range communication technologies include Bluetooth basic rate/enhanced data rate (BR/EDR), Bluetooth Low Energy (LE), IEEE 802.11 wireless local area network (WLAN), IEEE 802.15.4, and near field communication technologies, such as radio frequency identification (RFID) and near field communication (NFC) technology that enable contactless identification and interconnection of wireless devices. Bluetooth Technology provides an example of wireless short-range communication establishment.

B. Connection Formation Between Bluetooth™ Devices

A procedure for forming connections between Bluetooth™ devices is described in the Bluetooth™ Specification, Version 4.1, Dec. 3, 2013. The Bluetooth™ Baseband is the part of the Bluetooth™ system that implements the Media Access Control (MAC) and physical layer procedures to support the connection formation, exchange of data information streams, and ad hoc networking between Bluetooth™ devices. Connection formation may include inquiry, inquiry scanning, inquiry response, in addition to paging, page scanning, and page response procedures.

1. Inquiry

Inquiry is a procedure where a Bluetooth™ device transmits inquiry messages and listens for responses in order to discover the other Bluetooth™ devices that are within the coverage area and set discoverable. Bluetooth™ devices use the inquiry procedure to discover nearby devices, or to be discovered by devices in their locality. A Bluetooth™ device that tries to find other nearby devices is known as an inquiring device and actively sends inquiry requests. Bluetooth™ devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

Bluetooth™ devices communicate with one another over 79 physical channels. An inquiring device wanting to discover other devices repetitively probes a first set of 16 frequencies, probing two frequencies every 1250 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring device broadcasts inquiry packets on these 32 carrier frequencies.

During the inquiry procedure, the inquiring device or master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, may regularly enter the inquiry scan substate to respond to inquiry messages. During the inquiry substate, the discovering device collects the Bluetooth™ device addresses of all devices that respond to the inquiry message. In addition, the discovering device may also collect extended information (e.g. local name and supported services) from devices that respond with an extended inquiry response packet. It may then, if desired, make a connection to any one of the discovered devices by means of the page procedure described below. The inquiry message broadcast by the source does not contain any information about the source. However, it may indicate which class of devices should respond. There is one general inquiry access code (GIAC) to inquire for any device, and 63 values have been reserved as dedicated inquiry access codes (DIAC) that only inquire for a certain type of device. The inquiry access codes are derived from reserved Bluetooth™ device addresses. There is only one DIAC defined in the Bluetooth™ Specification, and it is called the Limited Inquiry Access Code (LIAC). The LIAC is only intended to be used for limited time periods in scenarios where both devices have been explicitly caused to enter this state, usually by user action.

Inquiry scan is a procedure where a Bluetooth™ device listens for inquiry messages received on its inquiry scan physical channel. A device using one of its inquiry scan channels changes the inquiry channel every 1.28 s until it receives an inquiry message on the current channel from another Bluetooth™ device. This is identified by the appropriate inquiry access code. The inquiry scanning device will then follow the inquiry response procedure to return a response to the inquiring device. The inquiry scan substate is very similar to the page scan substate. However, instead of scanning for the device's device access code, the receiver may scan for the inquiry access code long enough to completely scan for 16 inquiry frequencies. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval shall be less than or equal to 2.56 s.

2. Inquiry Response

An inquiry response packet (frequency hop synchronization (FHS)) is transmitted from the inquiry scanning device or slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient may return an inquiry response (FHS) packet containing the recipient's device address (BD_ADDR) and other parameters. If the recipient has non-zero extended inquiry response data to send, it may return an extended inquiry response packet after the FHS packet. On the first inquiry message received in the inquiry scan substate the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit set to zero.

A contention problem could arise when several devices are in close proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1003, however, for scanning intervals less than 1.28 s MAX_RAND may be as small as 127. A profile that uses a DIAC may choose to use a smaller MAX_RAND than 1003 even when the scanning interval is greater than or equal to 1.28 s. The slave will return to the CONNECTION or STANDBY state for the duration of at least RAND time slots. Before returning to the CONNECTION and STANDBY state, the device may go through the page scan substate. After at least RAND slots, the device will add an offset of 1 to the phase in the inquiry hop sequence (the phase has a 1.28 second resolution) and return to the inquiry scan substate again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's Bluetooth™ device address, native clock and other slave information. This FHS packet is returned at times that tend to be random. If the slave has non-zero extended inquiry response data to send it will return an FHS packet with the EIR bit set to one to the master 625 us after the inquiry message was received. It then returns an extended inquiry response packet 1250 us after the start of the FHS packet. FHS is always returned 625 us after inquiry message was received. But, consecutive FHS packets are returned according to this random process. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

The retransmission of the inquiry response can be received by the inquiring devices within roughly 80 or 640 ms depending on inquiry scan interval of the discovered device. The random backoff for devices using scanning interval <1.28 s is from 0 to 79,375 ms and for other devices from 0 to 639,375 ms. The device using the default inquiry interval is using the latter value range.

In order to collect responses from all devices in the range in an error-free environment, the inquiry substate may have to last for 10.24 s unless the inquirer collects enough responses and aborts the inquiry substate earlier. If desired, the inquirer may also prolong the inquiry substate to increase the probability of receiving all responses in an error-prone environment. In consequence of long inquiry state compared to relatively short backoff times, multiple responses may be received from the single device.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) packet with type DM1, DM3, DM5, DH1, DH3 or DH5. To minimize interference it is recommended to use the shortest packet that is capable of containing the data. The packet is sent on the same frequency as the FHS packet, 1250 microseconds after the start of the FHS packet. In the packet header, LT_ADDR may be set to zero. TYPE may be one of DM1, DM3, DM5, DH1, DH3 or DH5. FLOW, ARQN and SEQN may all be set to zero and ignored during receipt. The HEC LFSR may be initialized with the same DCI (default check initialization) as for the FHS packet. In the payload header, LLID may contain the value 10 (start of an L2CAP message or no fragmentation). FLOW may be set to zero and ignored upon receipt. The length of the payload body (LENGTH) may be smaller than or equal to 240 bytes. The CRC LFSR may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all IACs.

4. Pane

The procedure for forming connections is asymmetrical and requires that one Bluetooth device carries out the page (connection) procedure while the other Bluetooth device is connectable (page scanning) The procedure is targeted, so that the page procedure is only responded to by one specified Bluetooth device.

Page is the initial phase of the connection procedure where a device transmits a train of page messages until a response is received from the target device, stopped by the host or a timeout occurs.

The connectable device uses a special physical channel to listen for connection request packets from the paging (connecting) device. This physical channel has attributes that are specific to the connectable device, hence only a paging device with knowledge of the connectable device is able to communicate on this channel.

Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as Bluetooth™ device address of the slave device. The necessary information may be received by other means, such as Out-Of-Band pairing. Also the page is not always preceded with inquiry, because the address may be known beforehand (for example saved from previous connections).

In the paging procedure, the Bluetooth™ device that will become the master carries out a page procedure by transmitting page messages in connection request packets to the specified Bluetooth™ slave device that carries out a page scanning procedure to listen for connection request packets from the paging device.

A connectable Bluetooth™ device listens for a page request on its page scan channel and, once received, enters into a sequence of exchanges with the paging device. In order for a device to connect to another device, it performs frequency hopping all page scan channel frequencies, sending a page request on each frequency and listening for a response.

The page scan channel uses an access code derived from the scanning device's Bluetooth™ device address BD_ADDR to identify communications on the channel. The page scan channel uses a slower hopping rate than the hop rate of the paging device, using the Bluetooth™ device clock of the scanning device as an input.

A device listening on its page scan channel remains passive until it receives a page request from another Bluetooth™ device, identified by the page scan channel access code. The two devices will then follow the page procedure to form a connection where the paging device is the master and the page scan device is the slave in a piconet.

In order for a paging device to connect to another Bluetooth™ device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's Bluetooth™ clock, such as indicated during a previous inquiry transaction between the two devices, and may be able to predict the phase of the target device's page scan channel. It may use this information to optimize the synchronization of the paging and page scanning process and speed up the formation of the connection.

5. Page Response

After having received the page message, the slave device transmits a page slave response message that is the slave's device access code. The slave shall transmit this response 625 µs after the beginning of the received page message and at the response hop frequency that corresponds to the hop frequency in which the page message was received. The slave transmission is therefore time aligned to the master transmission. During initial messaging, the slave shall still use the page response hopping sequence to return information to the master. The clock input CLKN16-12 shall be frozen at the value it had at the time the page message was received. After having sent the response message, the slave's receiver shall be activated 312.5 µs after the start of the response message and shall await the arrival of a frequency hop synchronization (FHS) page master response packet. Note that an FHS packet can arrive 312.5 µs after the arrival of the page message, and not after 625 µs as is usually the case in the piconet physical channel RX/TX timing.

If an FHS page master response packet is received by the slave in the slave response substate, the slave shall return a page slave response message to acknowledge reception of the FHS packet. This response shall use the page response hopping sequence. The transmission of the page slave response packet is based on the reception of the FHS page master response packet. Then the slave shall change to the master's channel access code and clock as received from the FHS packet. Only the 26 MSBs of the master clock are transferred: the timing shall be such that CLK1 and CLK0 are both zero at the time the FHS packet was received as the master transmits in even slots only. The offset between the master's clock and the slave's clock shall be determined from the master's clock in the FHS page master response packet and reported to the slave's Baseband Resource Manager.

Finally, the slave enters the CONNECTION state. From then on, the slave shall use the master's clock and the master's BD_ADDR to determine the basic channel hopping sequence and the channel access code. The slave shall use the LT_ADDR in the FHS page master response payload as the primary LT_ADDR in the CONNECTION state. The connection mode shall start with a POLL packet transmitted by the master. The slave may respond with any type of packet. If the POLL packet is not received by the slave, or the response packet is not received by the master, within newconnectionTO number of slots after FHS packet acknowledgement, the master and the slave shall return to page and page scan substates, respectively.

C. Bluetooth™ Low Energy (LE) Technology

The Bluetooth™ Core Specification, Version 4.1 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, separated by 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 10 octets to a maximum of 47 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.1, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

The scanner device, also referred to as the initiator device, that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.1, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth™ Specification V4.1, Bluetooth LE device discovery involves different operational processes for devices with different roles. In particular:

Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONNECT_REQ" to establish a connection with that advertiser. For a scanner, it can send out a "SCAN_REQ" to ask for more information from that advertiser.

The CONNECT_REQ_PDU has a payload field that consists of InitA, AdvA and LLData fields. The InitA field contains the Initiator's public or random device address, as indicated by a transmit address flag. The AdvA field contains the advertiser's public or random device address, as indicated by a receive address flag. The LLData consists of 10 fields, such as the Link Layer connection's Access Address, a channel map, a hop count increment, and other parameters needed to set up the connection.

The SCAN_REQ PDU has a payload field that consists of ScanA and AdvA fields. The ScanA field contains the scanner's public or random device address, as indicated by a transmit address flag. The AdvA field is the address of the device to which this PDU is addressed and contains the advertiser's public or random device address, as indicated by a receive address flag.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

1. Bluetooth™ LE Discovery:

At the start of each advertising event, the advertiser sends an advertising packet corresponding to the advertising event type. Depending on the type of advertising packet, the scanner may make a request to the advertiser on the same advertising PHY channel which may be followed by a response from the advertiser on the same advertising PHY channel. The advertising PHY channel changes on the next advertising packet sent by the advertiser in the same advertising event. The advertiser may end the advertising event at any time during the event. The first advertising PHY channel is used at the start of the next advertising event.

Initiator devices that are trying to form a connection to another device listen for connectable advertising packets. If the advertiser is using a connectable advertising event, an initiator may make a connection request using the same advertising PHY channel on which it received the connectable advertising packet. The advertising event is ended and connection events begin if the advertiser receives and accepts the request for a connection be initiated. Once a connection is established, the initiator becomes the master device in a piconet and the advertising device becomes the slave device. Connection events are used to send data packets between the master and slave devices.

Figure 2A:
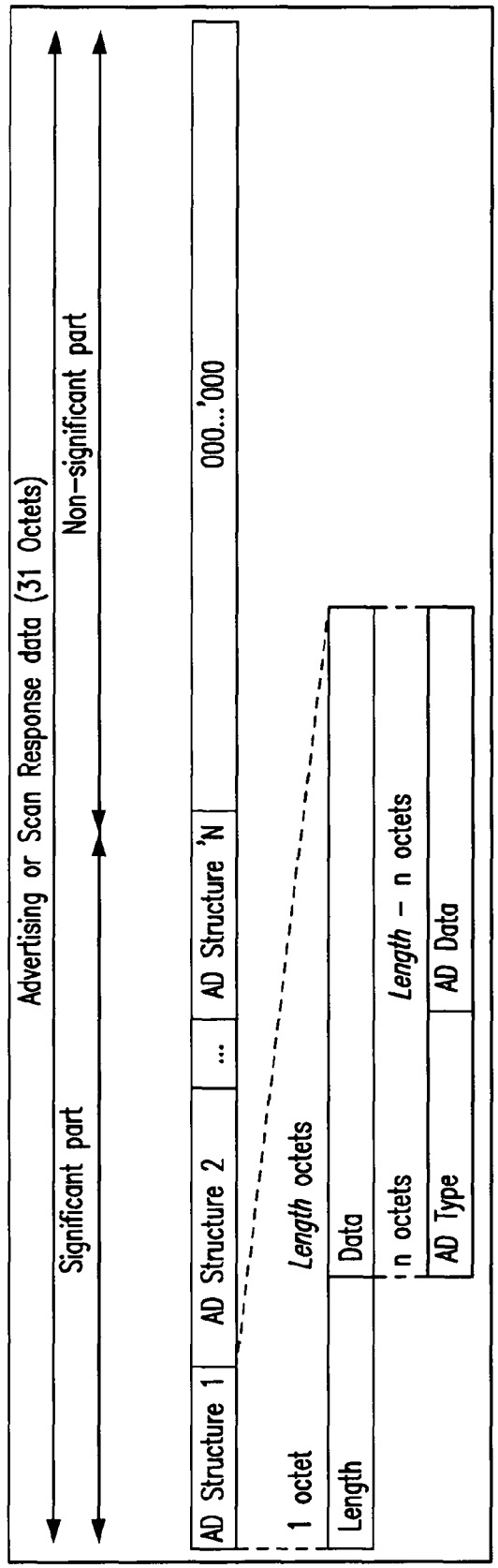
FIG. 2A is an illustration of an example format for the Bluetooth™ Low Energy protocol (BTLE) advertising messages, in accordance with at least one embodiment of the present invention.

The format of Advertising data and Scan Response data is shown in FIG. 2A. The data consists of a significant part and a non-significant part. The significant part contains a sequence of AD structures. Each AD structure shall have a Length field of one octet, which contains the Length value, and a Data field of Length octets. The first octet of the Data field contains the AD type field. The content of the remaining Length−1 octet in the Data field depends on the value of the AD type field and is called the AD data. The non-significant part extends the Advertising and Scan Response data to 31 octets and shall contain all-zero octets.

Devices are identified using a device address. Device addresses may be either a public device address or a random device address. A public device address and a random device address are both 48 bits in length. A device shall contain at least one type of device address and may contain both.

The public device address shall be created in accordance with section 9.2 ("48-bit universal LAN MAC addresses") of the IEEE 802-2001 standard (http://standards.ieee.org/getieee802/download/802-2001.pdf) and using a valid Organizationally Unique Identifier (OUI) obtained from the IEEE Registration Authority (http://standards.ieee.org/regauth/oui/forms/ and sections 9 and 9.1 of the IEEE 802-2001 specification).

The public device address is divided into the following two fields:

company_assigned field is contained in the 24 least significant bits company_id field is contained in the 24 most significant bits.

For the purposes of this profile, the random device address may be of either of the following two sub-types:

Static address

Private address

The private address may be of either of the following two sub-types:

Non-resolvable private address

Resolvable private address

Static and non-resolvable private address both contains address that is random. The main difference is that the device shall not change its static address value once initialized until the device is power cycled.

The random resolvable private device address is divided into the following two fields which can be used to identify the device:

hash field is contained in the 24 least significant bits, as defined in Bluetooth™ Core Specification, Version 4.1 [Vol. 3] Part C, Section 10.8.2.3.

random field is contained in the 24 most significant bits, as defined in Bluetooth™ Core Specification, Version 4.1 [Vol. 3] Part C, Section 10.8.2.2.

2. Bluetooth™ LE Pairing and Bonding

Pairing and key distribution over a BTLE physical link is defined by the Security Manager specification (Bluetooth™ Core Specification, Version 4.1 [Vol. 3], Part H Section 2.3).

The pairing process may be initiated if either slave or master device request pairing to enable link encryption and possible authentication.

The purpose of bonding is to create a relation between two Bluetooth devices based on a stored security and identity information. A transport specific key distribution is performed during pairing process to share the keys which can be used to encrypt a link in future reconnections, verify signed data and random address resolution.

LE security uses the following keys and values for encryption, signing, and random addressing:

1. Identity Resolving Key (IRK) is a 128-bit key used to generate and resolve random addresses.
2. Connection Signature Resolving Key (CSRK) is a 128-bit key used to sign data and verify signatures on the receiving device.
3. Long Term Key (LTK) is a 128-bit key used to generate the contributory session key for an encrypted connection. Link Layer encryption is described in Bluetooth™ Core Specification, Version 4.1 [Vol 6] Part B, Section 5.1.3.
4. Encrypted Diversifier (EDIV) is a 16-bit stored value used to identify the LTK. A new EDIV is generated each time a unique LTK is distributed.
5. Random Number (Rand) is a 64-bit stored valued used to identify the LTK. A new Rand is generated each time a unique LTK is distributed.

In order for devices using the privacy feature to reconnect to known devices, the device addresses used when the privacy feature is enabled, private address, must be resolvable to the other devices' identity. The private address is generated using the device's identity key exchanged during the bonding procedure.

The Identity Resolving Key (IRK) is used for resolvable private address construction (see [Part C], Generic Access Profile, Section 10.8.2. A master that has received IRK from a slave can resolve that slave's random resolvable private device addresses. A slave that has received IRK from a master can resolve that master's random resolvable private device addresses. The privacy concept only protects against devices that are not part of the set to which the IRK has been given.

While a device is in the Peripheral or the Central role the device may support the Bonding procedure. While a device is in the Broadcaster or the Observer role the device shall not support the bonding procedure. The Host of the Central initiates the pairing process as defined in Bluetooth™ Core Specification, Version 4.1 [Vol. 3], Part C Section 2.1 with the Bonding_Flags set to Bonding as defined in [Vol. 3], Part H Section 3.5.1. If the peer device is in the bondable mode, the devices shall exchange and store the bonding information in the security database.

If a device has privacy enabled (as defined in Bluetooth™ Core Specification, Version 4.1, Table 10.7), the Host should send it's IRK to the peer device and request the IRK of the peer device during the pairing procedure. The Host can abort the pairing procedure if the authentication requirements are not sufficient to distribute the IRK. If the pairing procedure fails due to authentication requirements and IRK distribution was requested, the pairing procedure should be retried without requesting IRK distribution.

D. Method for Device Discovery

It would be desirable to be able to have an accessory device, such as a wireless speaker, automatically discover and connect to a mobile wireless device via Bluetooth™ BR/EDR. Currently this operation has to be manually done by the user selecting the Bluetooth settings menu, to make mobile wireless device visible to the accessory device. Then as the accessory device performs the device discovery (inquiry) it may find other wireless devices in the vicinity, as well as the desired mobile wireless device. The accessory device will not be able to identify which device to page for Bluetooth™ BR/EDR connection establishment.

In accordance with an example embodiment of the invention, a first connection is created between the accessory device, such as a wireless speaker, and the mobile wireless device, over a first wireless carrier, the Bluetooth™ Low Energy (BTLE) protocol. BTLE pairing/bonding is initiated in order to transfer the device address of the mobile wireless device to the connected accessory device. Then, the accessory device uses the device address thus obtained, to initiate the desired connection over a second communication protocol, the Bluetooth™ BR/EDR, which shares the same device address. In this manner, the accessory device may automatically discover and connect to the mobile wireless device via Bluetooth™ BR/EDR protocol.

FIG. 1A is an illustration of an example embodiment of a network with an example multimedia wireless device 102, such as an audio speaker and/or video display, and a mobile wireless device 100. A multimedia wireless device 102 includes, in accordance with at least one example embodiment, at least an individual audio speaker 144 or display device 142. The mobile wireless device 100 is shown scanning for Bluetooth™ Low Energy protocol (BTLE) advertising messages 150. The multimedia wireless device 102 is shown transmitting BTLE advertising messages 150 containing a description of the multimedia wireless device capabilities. Advertising messages 150 may be the connectable undirected advertising (ADV_IND) channel packet. The ADV_IND PDU has a payload field containing AdvA and AdvData fields. The AdvA field contains the multimedia wireless device's 102 public or random device address and the AdvData field may contain Advertising data shown in FIG. 2A. When the multimedia wireless device 102 in the advertising state, enters the BTLE connection state, it will be in the BTLE slave role and the scanning mobile wireless device 100 will be in the BTLE master role in a BTLE data channel, in accordance with at least one embodiment of the present invention.

Figure 6:
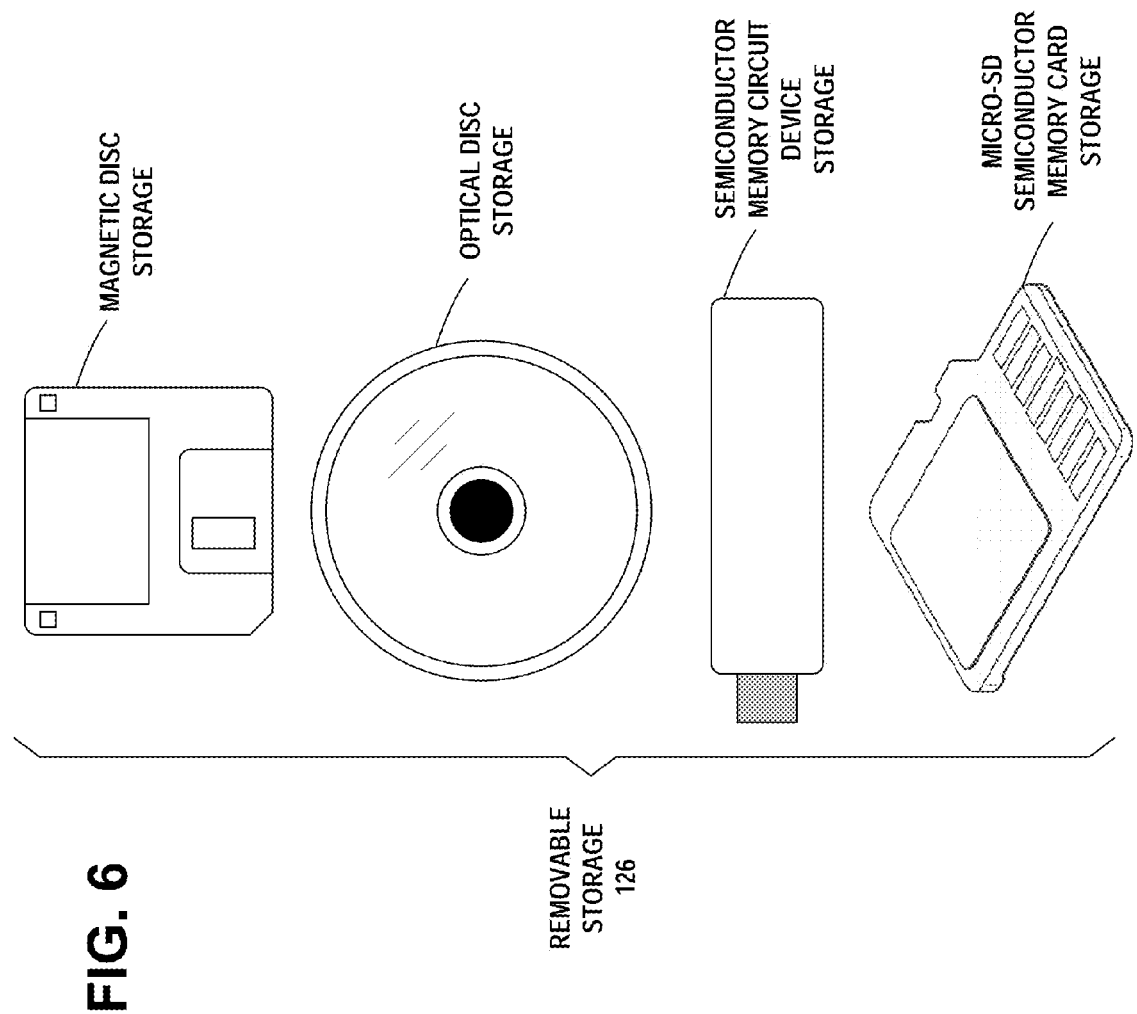
FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In example embodiments of the invention, the wireless mobile device 100 and the multimedia device s 102 may include a processor 122 that includes from one to many central processing units (CPUs) 124 and/or 125, a random access memory (RAM) 126, a read only memory (ROM) 127, and interface circuits to interface with one or more radio transceivers 116, antenna 132, 170, and battery or house power sources. A smart phone may include a keypad, display 142, etc. A wireless multimedia device may include a display device 142 and/or a speaker 144. The RAM and ROM can be removable memory devices such as smart cards, SIMs, WIMs, semiconductor memories such as RAM, ROM, PROMS, flash memory devices, etc., as shown in FIG. 6. In an example embodiment of the invention, the RAM 126 in the mobile wireless device 100 may store information contained in received advertising messages 150, for example, a description of the capabilities of the sending multimedia device 102 in received advertising messages 150.

In an example embodiment of the invention, the Bluetooth mobile wireless device 100 and the wireless multimedia device 102 include both the Bluetooth™ protocol (BT) 115 and the Bluetooth™ Low Energy protocol (BTLE) 114.

In an example embodiment of the invention, the mobile wireless device 100 may be, for example, a miniature device such as a key fob, smart card, jewelry, or the like. In an example embodiment of the invention, the mobile wireless device 100 may be, for example, a relatively larger cell phone, smart phone, flip-phone, PDA, graphic pad. The mobile wireless device 100 may also be in an automobile or other vehicle. The wireless multimedia device 102 may be, for example, an audio speaker, video display, or gaming device that is either in a fixed position or mobile. In embodiments, the relative sizes of devices 100 and 102 may be arbitrary.

Figure 1B:
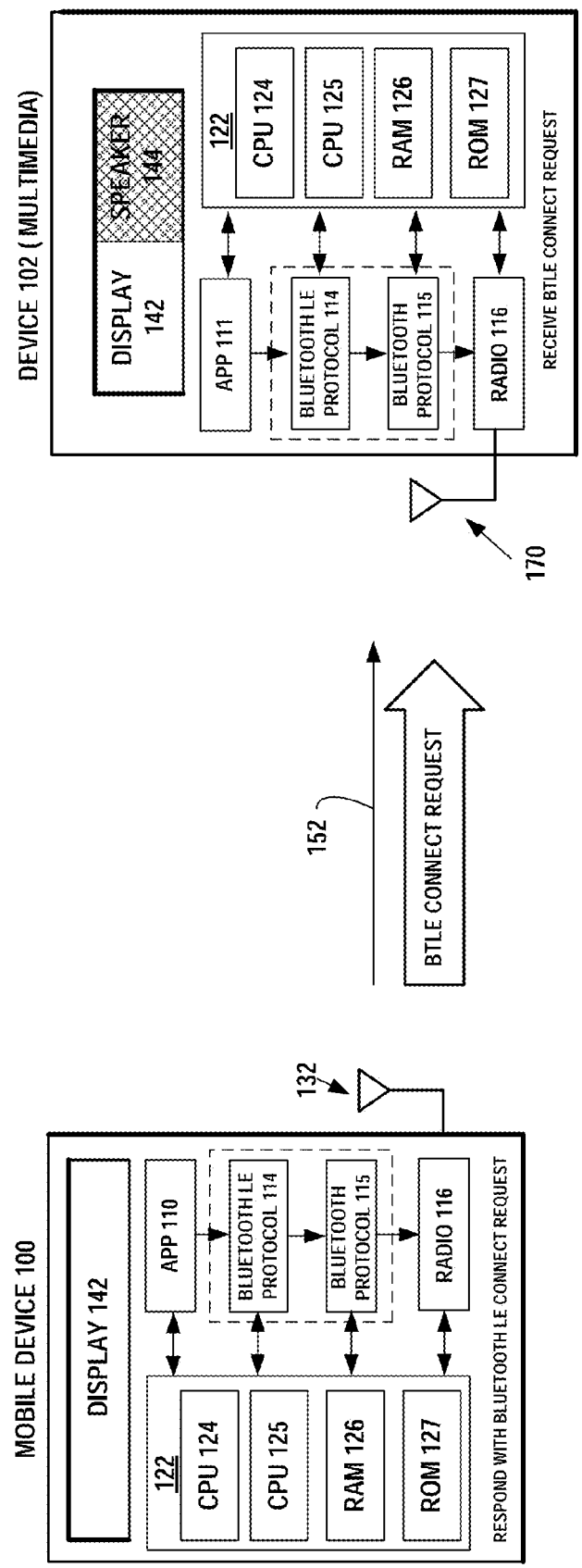
FIG. 1B is an illustration of an example embodiment of the network of FIG. 1A, wherein the mobile wireless device is shown responding to the advertising messages, by transmitting BTLE response messages, such as BTLE connect-request messages (CONNECT_REQ_PDU). This establishes a link level connection between the two devices. The multimedia wireless device may then request BTLE security from the mobile wireless device, which may then initiate the BTLE pairing and bonding process by transmitting a pairing request packet, in accordance with at least one embodiment of the present invention.

FIG. 1B is an illustration of an example embodiment of the network of FIG. 1A, wherein the mobile wireless device 100 is shown responding to the advertising messages 150, by transmitting BTLE response messages 152, such as BTLE connect-request messages (CONNECT_REQ_PDU). This establishes a link level connection between the two devices. The multimedia wireless device 102 may then request BTLE security from mobile wireless device 100, which may then initiate the BTLE pairing and bonding process. The security may be initiated also by the wireless mobile device 100, without a request from multimedia wireless device 102. This may be initiated as a result of an action, such as trying to read a value that requires an encrypted link, or just because wireless mobile device 100 wants to initiate security.

Phase 1 of the pairing process uses the Pairing Feature Exchange to exchange input/outpour (IO) capabilities, out-of-band (OOB) authentication data availability, authentication requirements, key size requirements and which transport specific keys to distribute. The IO capabilities, OOB authentication data availability and authentication requirements are used to determine the short term key (STK) Generation method used in Phase 2. After the short term keys are generated in both devices, an encrypted connection is established with the key generated in phase 2.

Figure 1C:
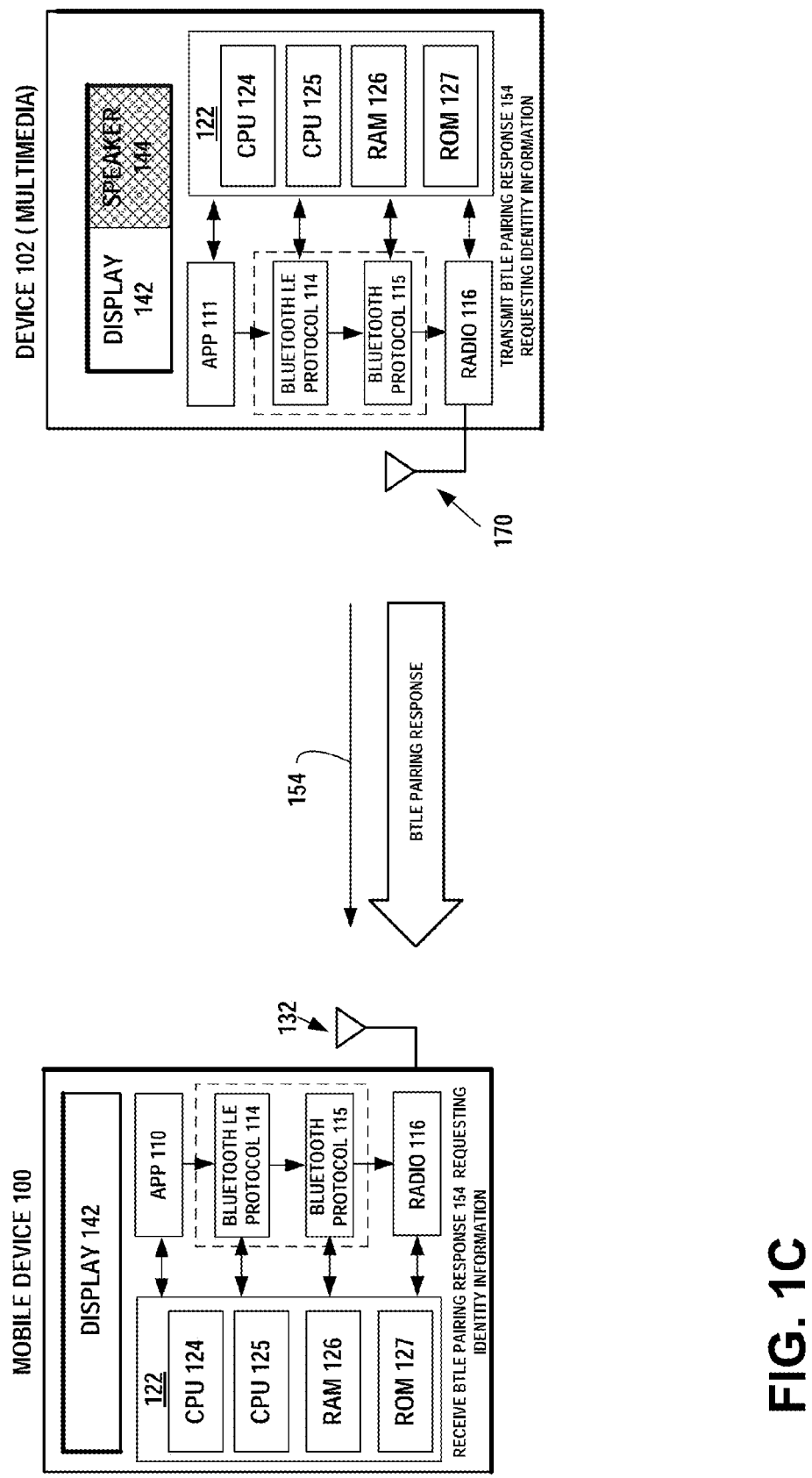
FIG. 1C is an illustration of an example embodiment of the network of FIG. 1B, during the pairing process, wherein the multimedia wireless device, transmits a pairing response packet requesting identity information of the mobile wireless device, which is to be transmitted in a transport specific key distribution phase of the pairing process, in accordance with at least one embodiment of the present invention.

FIG. 1C is an illustration of an example embodiment of the network of FIG. 1B, during phase 1 of the pairing process, wherein the multimedia wireless device 102, transmits a BTLE pairing response packet 154 requesting identity information of the mobile wireless device 100, to request pairing. In response, the identity information of the mobile wireless device 100 will be transmitted to the multimedia wireless device 102 in a transport specific key distribution phase of the pairing process (shown in FIG. 1D).

In an alternate embodiment of the invention, the role of establishing BTLE security and pairing may be performed by the mobile wireless device 100, instead of by the multimedia wireless device 102. The mobile wireless device 100 may request BTLE security from the multimedia wireless device 102, which may then initiate the BTLE pairing and bonding process. The mobile wireless device 100 receives the multimedia wireless device's 102 public or random device address contained in the received advertising messages 150.

Figure 1D:
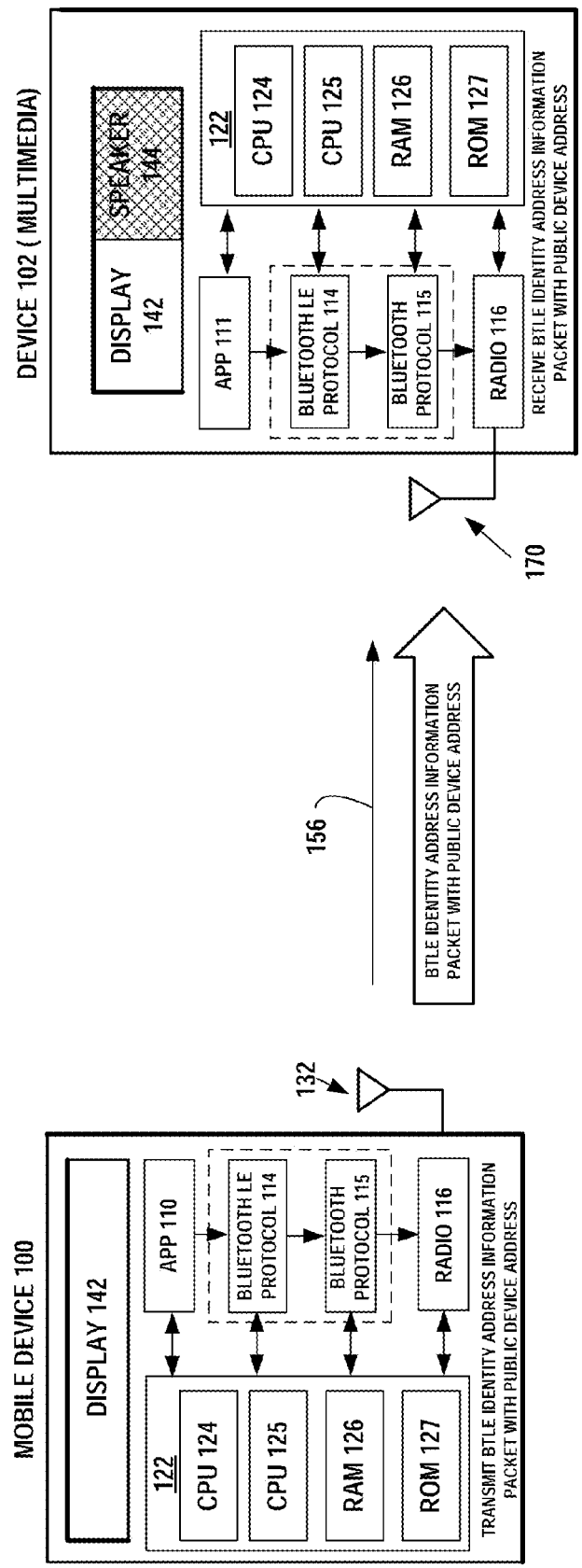
FIG. 1D is an illustration of an example embodiment of the network of FIG. 1C, during key distribution in phase 3 of the pairing process, specifically the transport specific key distribution phase, wherein the mobile wireless device transmits its identity information in the form of its public device address, in an identity address information packet to the multimedia wireless device, in accordance with at least one embodiment of the present invention.

FIG. 1D is an illustration of an example embodiment of the network of FIG. 1C, during key distribution in phase 3 of the pairing process, specifically the transport specific key distribution phase, wherein the mobile wireless device 100 transmits its identity information in the form of its public device address BD_ADDR, in a BTLE identity address information packet 156 (shown in FIG. 4D) to the multimedia wireless device 102. The multimedia wireless device 102 uses the public device address received in the Bluetooth™ Low Energy protocol (BTLE) transport specific key distribution phase, to derive the access code in a Bluetooth™ basic rate/enhanced data rate protocol paging message, in accordance with at least one embodiment of the present invention.

The Bluetooth™ public device address is the unique 48-bit BD_ADDR. The Bluetooth™ public device address (BD_ADDR) shall be created in accordance with section 9.2 ("48-bit universal LAN MAC addresses") of the IEEE 802-2001 standard (http://standards.ieee.org/getieee802/download/802-2001.pdf) and using a valid Organizationally Unique Identifier (OUI) obtained from the IEEE Registration Authority (http://standards.ieee.org/regauth/oui/forms/ and sections 9 and 9.1 of the IEEE 802-2001 specification).

The Bluetooth™ public device address (BD_ADDR) is divided into the following two fields:
company_assigned field is contained in the 24 least significant bits;
company_id field is contained in the 24 most significant bits.

Figure 4A:
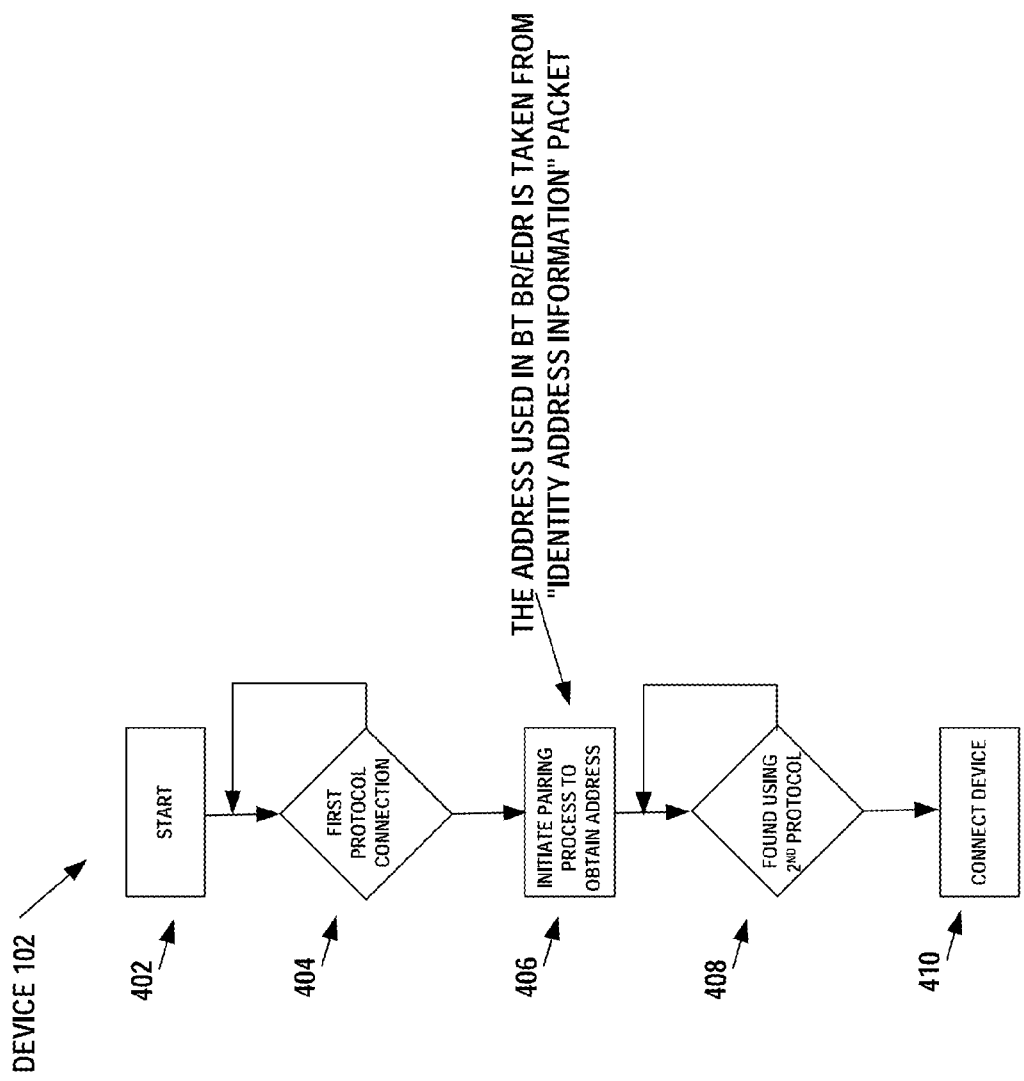
FIG. 4A is an illustration of an example flow diagram of an example process in the wireless multimedia device, carrying out the example operations, in accordance with at least one embodiment of the present invention.
Figure 4B:
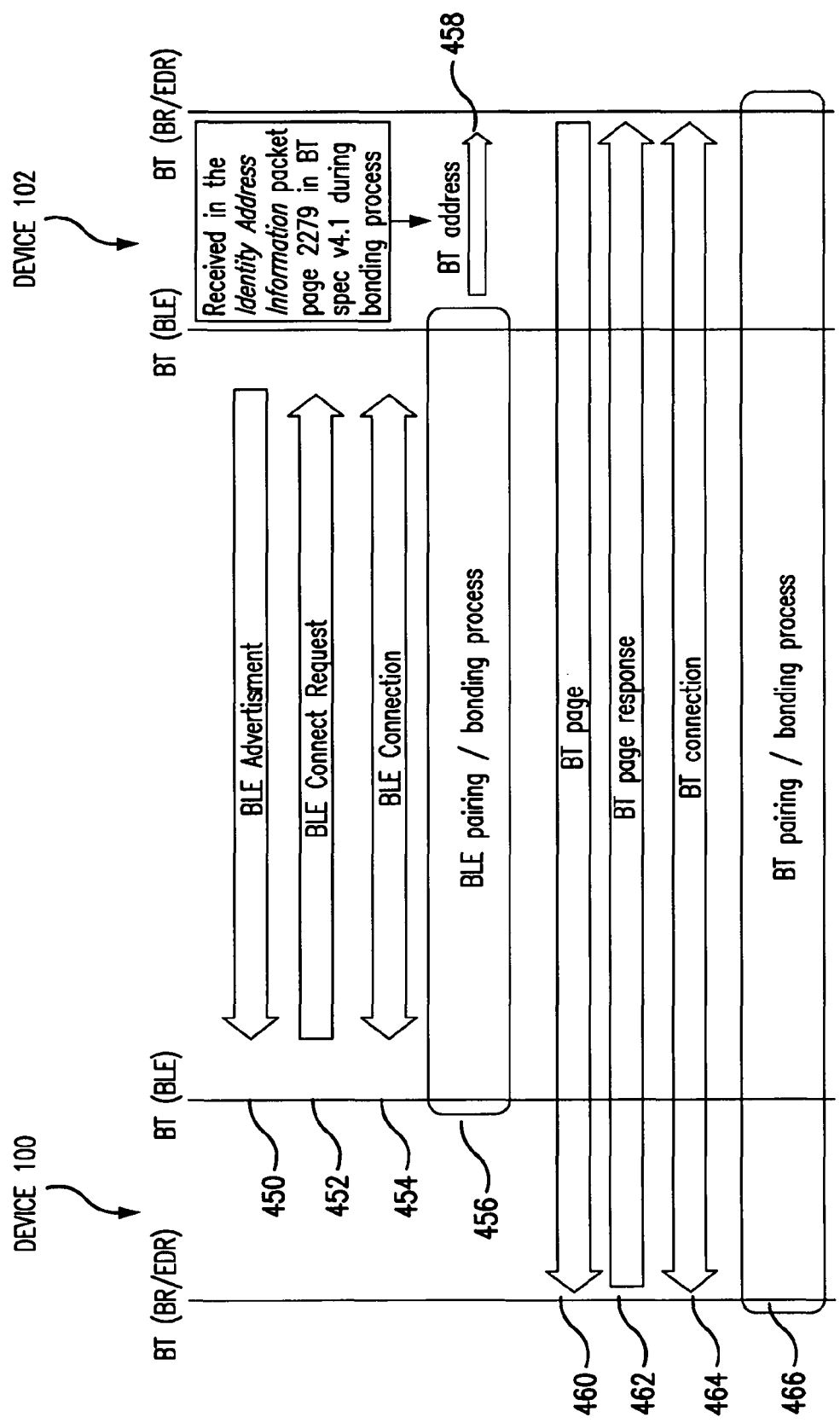
FIG. 4B is an illustration of an example sequence diagram of an example process in the wireless multimedia device, carrying out the example operations, in accordance with at least one embodiment of the present invention.
Figure 4C:
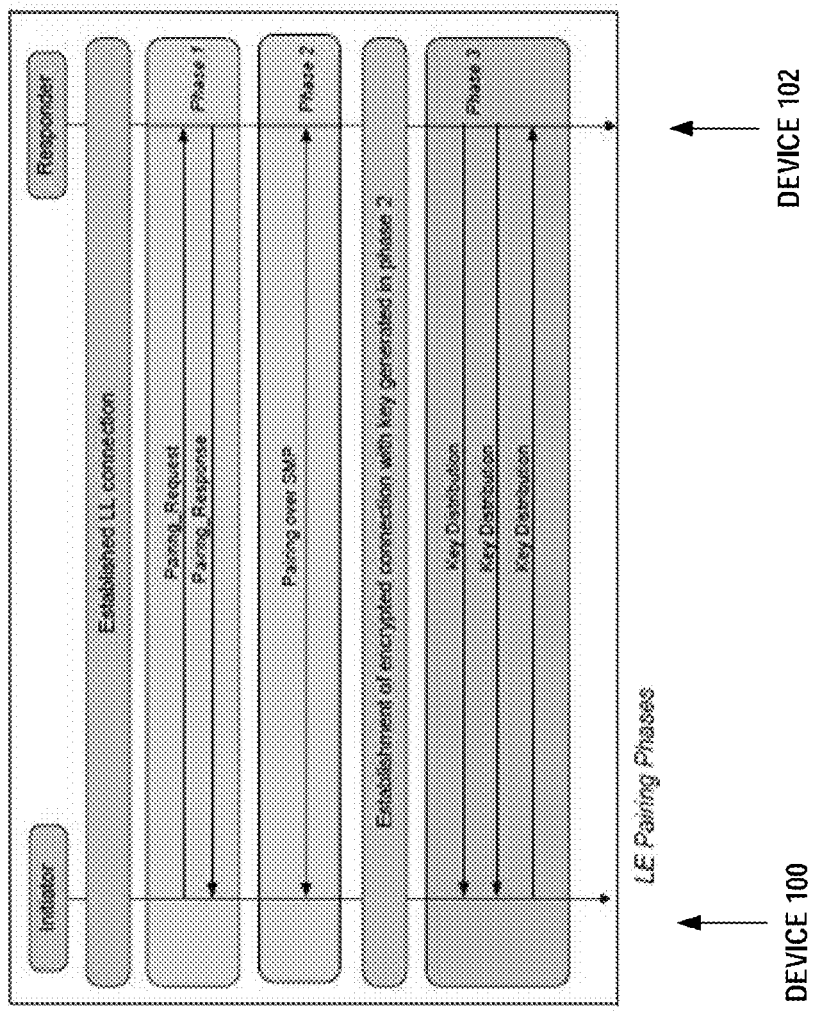
FIG. 4C is an illustration of an example sequence diagram of Bluetooth™ Low Energy protocol (BTLE) pairing, showing the three-phase process of Phase 1: Pairing Feature Exchange, Phase 2: Short Term Key (STK) Generation, and Phase 3: Transport Specific Key Distribution, in accordance with at least one embodiment of the present invention.
Figure 4D:
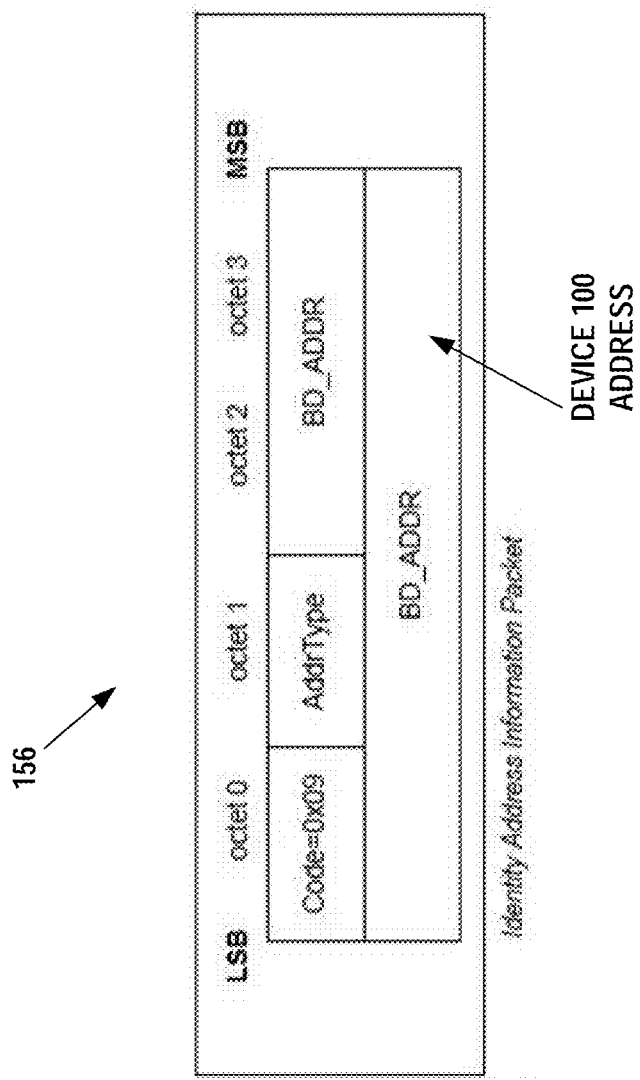
FIG. 4D is an illustration of an example format for the Bluetooth™ Low Energy protocol (BTLE) identity address information packet, in accordance with at least one embodiment of the present invention.
Figure 4E:
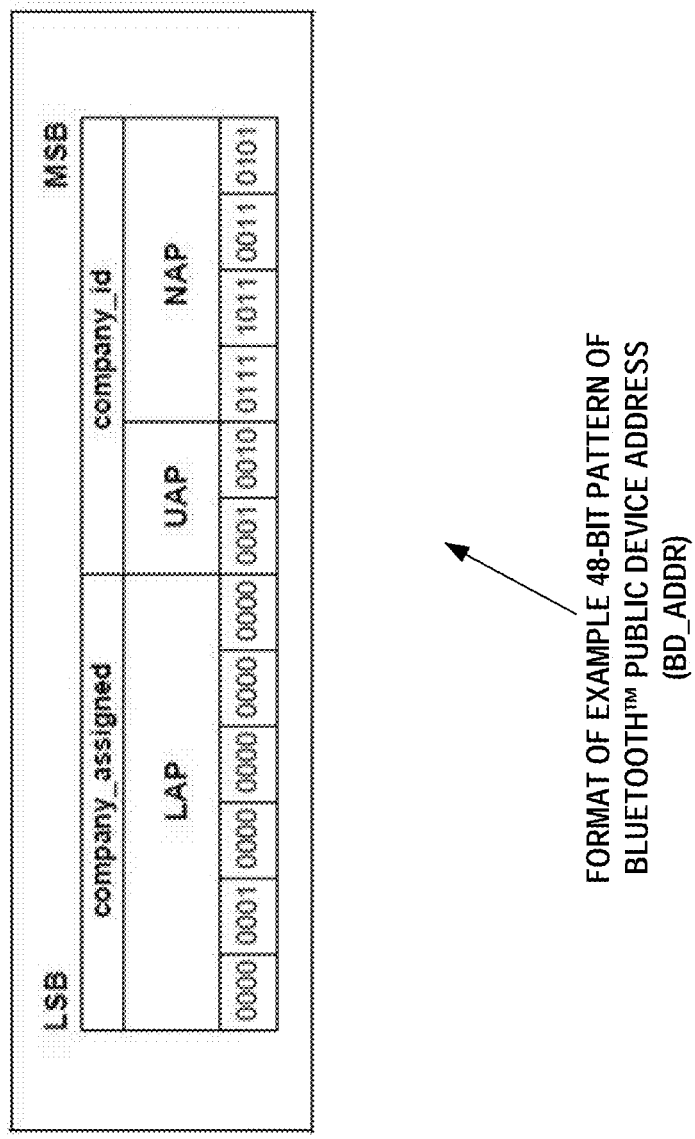
FIG. 4E is an illustration of an example format for the 48-bit pattern of the Bluetooth™ public device address (BD_ADDR), in accordance with at least one embodiment of the present invention.

The 48-bit pattern of an example Bluetooth™ public device address (BD_ADDR) is shown in FIG. 4E. The 24-bit Lower Address Part (LAP) and the 8-bit Upper Address Part (UAP) form the significant part of the BD_ADDR. The remaining 16-bits form the Non-significant Address Part (NAP) of the BD_ADDR. The BD_ADDR may take any values except the 64 reserved LAP values for general and dedicated inquiries.

Figure 1E:
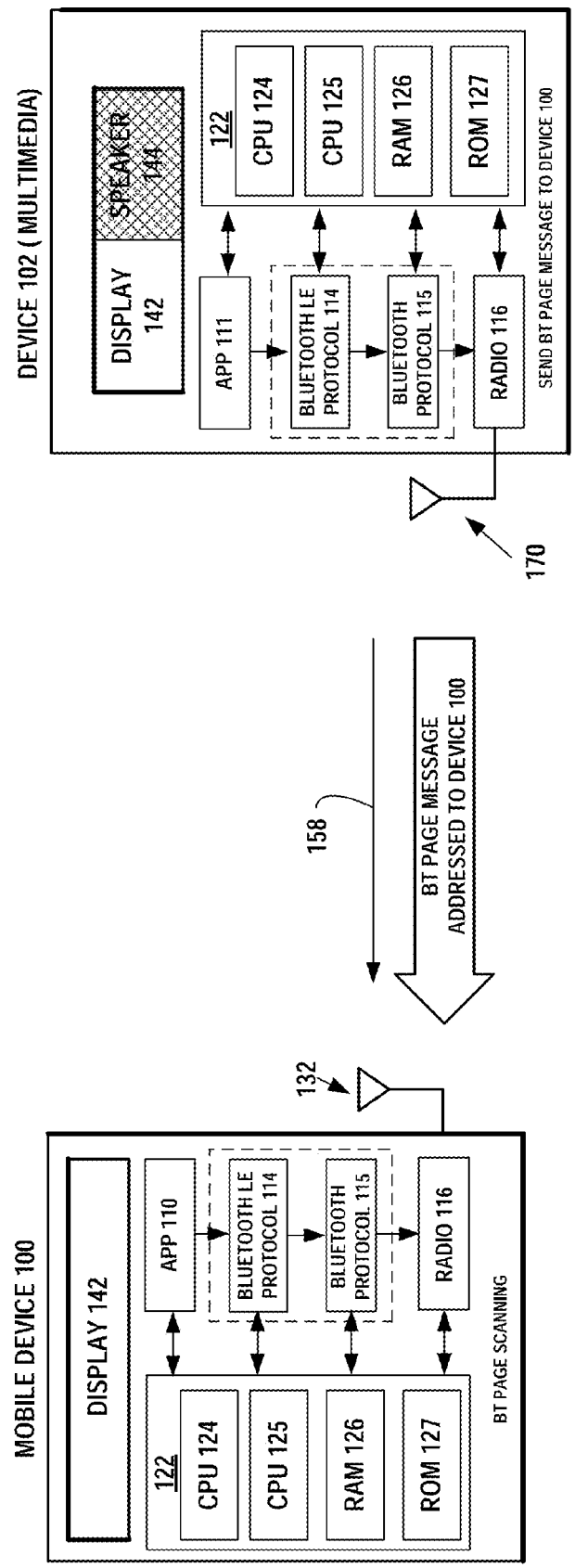
FIG. 1E is an illustration of an example embodiment of the network of FIG. 1D, wherein the multimedia wireless device actively initiates a Bluetooth™ basic rate/enhanced data rate (BR/EDR) connection with the mobile wireless device. The multimedia wireless device is shown transmitting a Bluetooth™ basic rate/enhanced data rate protocol paging message to the mobile wireless device, using the device address received in the Bluetooth™ Low Energy protocol (BTLE) transport specific key distribution phase of the pairing process, to derive the access code, in accordance with at least one embodiment of the present invention.

FIG. 1E is an illustration of an example embodiment of the network of FIG. 1D, wherein the multimedia wireless device 102 actively initiates a Bluetooth™ basic rate/enhanced data rate (BR/EDR) connection with the mobile wireless device 100. The multimedia wireless device 102 is shown transmitting a Bluetooth™ BR/EDR protocol paging message 158 to the mobile wireless device 100, using the device address received in the BTLE identity address information packet 156, to derive the access code, in accordance with at least one embodiment of the present invention.

In the alternate embodiment of the invention, the mobile wireless device 100 may actively initiate a Bluetooth™ basic rate/enhanced data rate (BR/EDR) connection with the multimedia wireless device 102. The mobile wireless device 100 may transmit a Bluetooth™ BR/EDR protocol paging message to the multimedia wireless device 102, using the device address contained in the received advertising messages 150, to derive the access code. The mobile wireless device 100 may then enter a BR/EDR connection state with the multimedia wireless device 102.

Figure 1F:
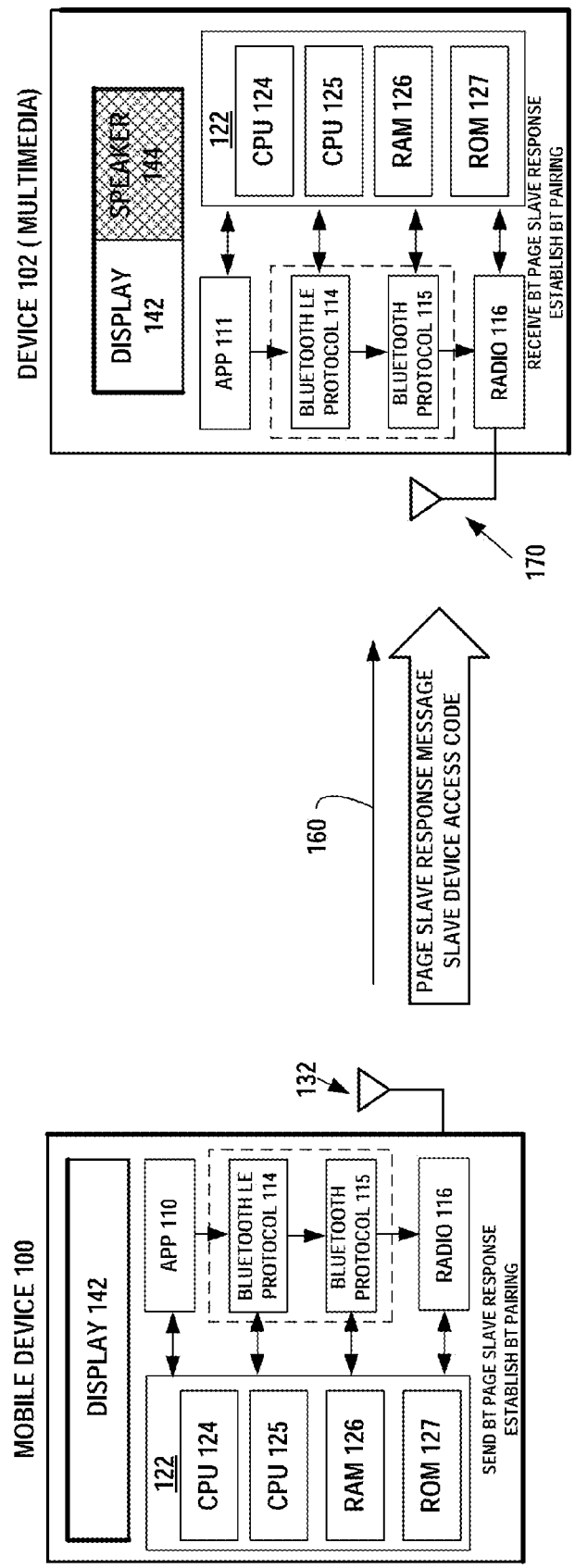
FIG. 1F is an illustration of an example embodiment of the network of FIG. 1E, wherein the mobile wireless device is shown exchanging or transmitting a Bluetooth™ basic rate/enhanced data rate page slave response message to the multimedia wireless device, in accordance with at least one embodiment of the present invention.

FIG. 1F is an illustration of an example embodiment of the network of FIG. 1E, wherein the mobile wireless device 100 is shown exchanging or transmitting a Bluetooth™ BR/EDR page slave response message 160 to the multimedia wireless device 102, which includes a slave device access code, in accordance with at least one embodiment of the present invention.

Figure 1G:
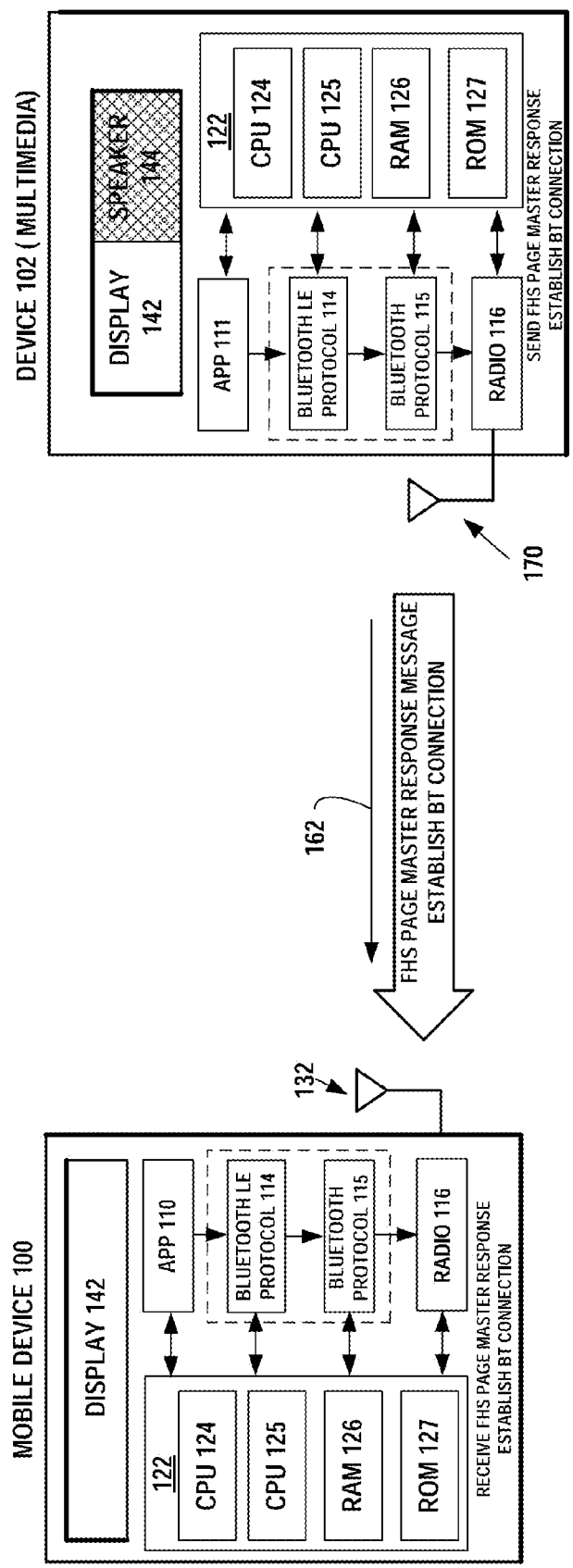
FIG. 1G is an illustration of an example embodiment of the network of FIG. 1F, wherein the multimedia device is shown exchanging or transmitting a Bluetooth™ basic rate/enhanced data rate page master response message to the mobile wireless device, and establishing a connection, in accordance with at least one embodiment of the present invention.

FIG. 1G is an illustration of an example embodiment of the network of FIG. 1F, wherein the multimedia wireless device 102 is shown transmitting a Bluetooth™ BR/EDR page master response message 162 to the mobile wireless device 100, and establishing a connection, in accordance with at least one embodiment of the present invention. There may be several page slave response messages and page master response messages exchanged to establish the Bluetooth™ BR/EDR connection. The response message 162 may be a frequency hop synchronization (FHS) page master response packet containing the information for the mobile wireless device 100, now a BR/EDR slave device, to enter a connection state with the multimedia wireless device 102, now a BR/EDR master device.

FIG. 2A is an illustration of an example format for the Bluetooth™ Low Energy protocol (BTLE) advertising messages 150, in accordance with at least one embodiment of the present invention. The format of Advertising data and Scan Response data consists of a significant part and a non-significant part. The significant part contains a sequence of AD structures. Each AD structure shall have a Length field of one octet, which contains the Length value, and a Data field of Length octets. The first octet of the Data field contains the AD type field. The content of the remaining Length−1 octet in the Data field depends on the value of the AD type field and is called the AD data. The non-significant part extends the Advertising and Scan Response data to 31 octets and shall contain all-zero octets.

Figure 2B:
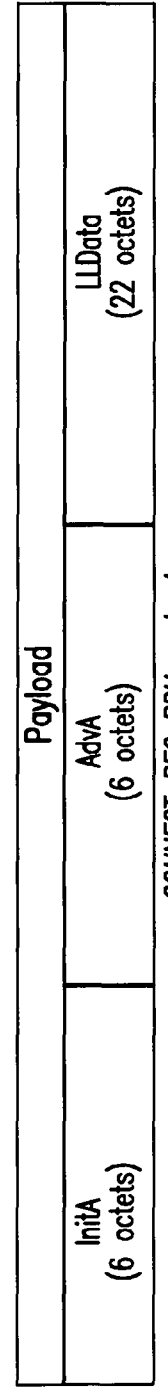
FIG. 2B is an illustration of an example format for the Bluetooth™ Low Energy protocol (BTLE) connect request message, in accordance with at least one embodiment of the present invention.

FIG. 2B is an illustration of an example format for the Bluetooth™ Low Energy protocol (BTLE) connect request message 152, CONNECT_REQ_PDU, in accordance with at least one embodiment of the present invention. The CONNECT_REQ_PDU has a payload field that consists of InitA, AdvA fields, and LLData. The InitA field may contain a random device address the mobile wireless device's 100, as indicated by a transmit address flag. The AdvA field is the address of the device to which this PDU is addressed and contains the advertiser's public or random device address, as indicated by a receive address flag.

Figure 3A:
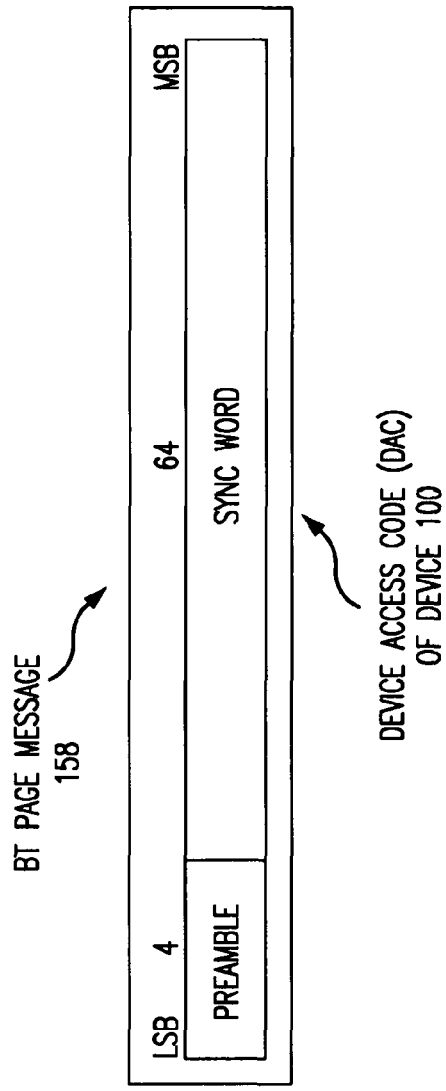
FIG. 3A is an illustration of an example format for the Bluetooth™ BR/EDR page messages, in accordance with at least one embodiment of the present invention.

FIG. 3A is an illustration of an example format for the Bluetooth™ BR/EDR page messages 158, in accordance with at least one embodiment of the present invention. The page message 158 consists of the device access code (DAC) with a fixed length of 68 bits. The preamble portion is a fixed zero-one pattern of 4 symbols used to facilitate DC compensation. The sync word is a 64-bit code word derived from the 24 bit Lower Address Part (LAP) in the mobile wireless device's 100 Bluetooth™ device address BD_ADDR, to identify communications on the channel. The mobile wireless device 100 listens on its page scan channel until it receives a page message 158 identified by the page scan channel access code. The mobile wireless device 100 uses a bit correlator to match the received page message 158 to the known bit sequence of its own access code. The device address BD_ADDR of the mobile wireless device 100, received by the multimedia wireless device 102 in the BTLE identity address information packet 156, is used by the multimedia wireless device 102 to derive the access code in the Bluetooth™ BR/EDR paging message 158 that it transmits, in accordance with at least one embodiment of the present invention.

Figure 3B:
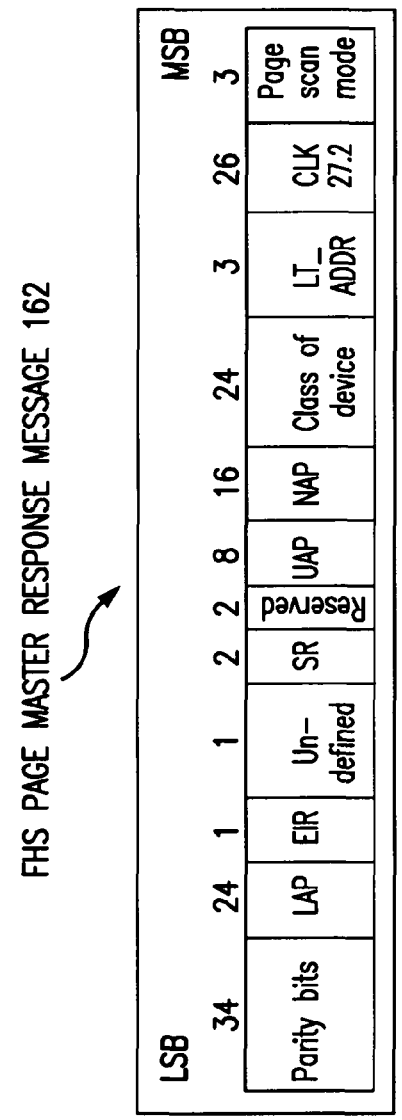
FIG. 3B is an illustration of an example format for the Bluetooth™ BR/EDR page master response message, in accordance with at least one embodiment of the present invention.

FIG. 3B is an illustration of an example format for the Bluetooth™ BR/EDR page master response message, in accordance with at least one embodiment of the present invention. The response message 162 is a frequency hop synchronization (FHS) page master response packet containing the information for the mobile wireless device 100, now a BR/EDR slave device, to enter a connection state with the multimedia wireless device 102, now a BR/EDR master device.

FIG. 4A is an illustration of an example flow diagram of an example process in the wireless multimedia device, carrying out the example operations, in accordance with at least one embodiment of the present invention. The steps include:

Step 402: Start.

Step 404: First protocol connection. As shown in FIG. 1B, the mobile wireless device responds to the advertising messages, by transmitting BTLE response messages, such as BTLE connect-request messages (CONNECT_REQ_PDU). This establishes a link level connection between the two devices.

Step 406: Initiate pairing process to obtain address (The address used in BT BR/EDR is taken from "Identity Address Information" packet). As shown in FIG. 1D, during the transport specific key distribution phase, the mobile wireless device transmits its identity information in the form of its public device address, in an identity address information packet to the multimedia wireless device.

Step 408: Found using second protocol. As shown in FIG. 1E, the multimedia wireless device transmits a Bluetooth™ basic rate/enhanced data rate protocol paging message to the mobile wireless device, using the device address received in the Bluetooth™ Low Energy protocol (BTLE) transport specific key distribution phase of the pairing process.

Step 410: Connect device. As shown in FIG. 1G, the multimedia device transmits a Bluetooth™ basic rate/enhanced data rate page master response message to the mobile wireless device, and establishes a connection.

FIG. 4B is an illustration of an example diagram of a sequence of steps between the mobile wireless device 100 and the multimedia wireless device 102:

Step 450: BTLE advertisement. As shown in FIG. 1A, the mobile wireless device is shown scanning for Bluetooth™ Low Energy protocol (BTLE) advertising messages and the multimedia wireless device is shown transmitting BTLE advertising messages, which may contain for example a description of the multimedia wireless device capabilities.

Step 452: BTLE connect request. As shown in FIG. 1B, the mobile wireless device responds to the advertising messages, by transmitting BTLE response messages, such as BTLE connect-request messages (CONNECT_REQ_PDU).

Step 454: BTLE connection. This establishes a link level connection between the two devices.

Step 456: BTLE pairing/bonding process. As shown in FIG. 1C, during the pairing process, the multimedia wireless device transmits a pairing response packet requesting identity information of the mobile wireless device, which is to be transmitted in a transport specific key distribution phase of the pairing process.

Step 458: BT address (Received in the Identity Address Information packet during bonding process (Bluetooth™ Core Specification, Version 4.1, page 2279). As shown in FIG. 1D, during the transport specific key distribution phase, the mobile wireless device transmits its identity information in the form of its public device address, in an identity address information packet to the multimedia wireless device.

Step 460: BT page. As shown in FIG. 1E, the multimedia wireless device transmits a Bluetooth™ basic rate/enhanced data rate protocol paging message to the mobile wireless device, using an access code derived from the device address received in the Bluetooth™ Low Energy protocol (BTLE) transport specific key distribution phase of the pairing process.

Step 462: BT page response. As shown in FIG. 1F, the mobile wireless device transmits a Bluetooth™ basic rate/enhanced data rate page slave response message to the multimedia wireless device.

Step 464: BT connection. As shown in FIG. 1G, the multimedia device transmits a Bluetooth™ basic rate/enhanced data rate page master response message to the mobile wireless device, and establishes a connection.

Step 466: BT pairing/bonding process. Pairing process is used to create an encrypted link between two devices, followed by possible bonding process to store security and identity information.

FIG. 4C is an illustration of an example sequence diagram of Bluetooth™ Low Energy protocol (BTLE) pairing, showing the three-phase process of Phase 1: Pairing Feature Exchange, Phase 2: Short Term Key (STK) Generation, and Phase 3: Transport Specific Key Distribution. Pairing is performed to establish keys which can then be used to encrypt a link. A transport specific key distribution is then performed to share the keys which can be used to encrypt a link in future reconnections, verify signed data and random address resolution.

FIG. 4D is an illustration of an example format for the Bluetooth™ Low Energy protocol (BTLE) identity address information packet 156 that contains the public or static random device address of device 100. The Identity Address Information packet is used in the Transport Specific Key Distribution phase to distribute its public device address or static random address. The Identity Address Information command is only sent when the link has been encrypted or re-encrypted using the generated STK. The data fields are:

AddrType (1 octet)

If BD_ADDR is a public device address or set to all zeros, then AddrType is set to 0x00. If BD_ADDR is a static random device address then AddrType is set to 0x01.

BD_ADDR (6 octets)

If the distributing device has a public device address or a static random address it sets this field to its public device address or static random address, otherwise it sets this field to all zeros.

FIG. 5A is an illustration of an example flow diagram 500 of an example process in the mobile wireless device 100, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 502: establishing, by an apparatus, pairing with another wireless device to establish a secure relationship with the other device over a first wireless carrier and transmitting a device address of the apparatus associated with the secure relationship over the first wireless carrier;

Step 504: receiving, by the apparatus, wireless paging messages over a second wireless carrier from the other wireless device, the wireless paging messages being addressed to the apparatus using the device address associated with the secure relationship transmitted over the first wireless carrier; and Step 506: exchanging, by the apparatus, paging response messages over the second wireless carrier with the other wireless device, and establishing a wireless connection over the second wireless carrier with the other wireless device.

Figure 5B:
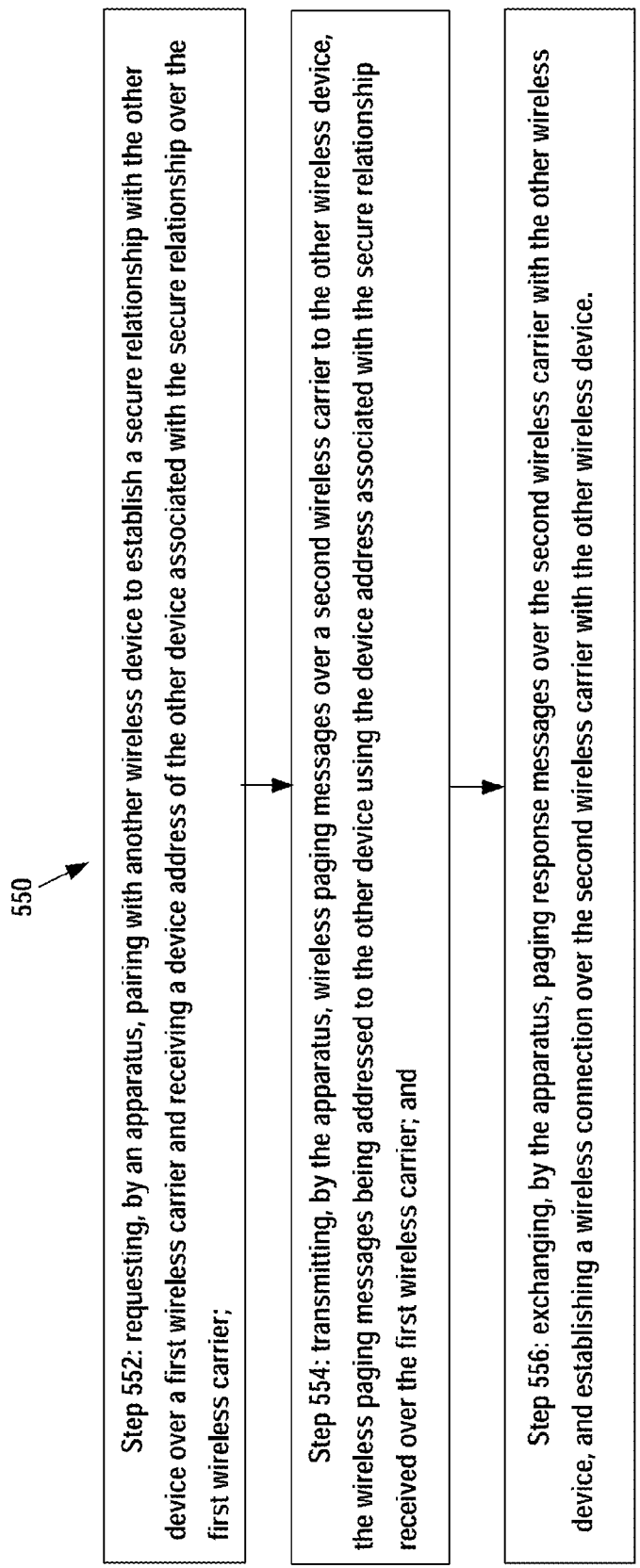
FIG. 5B is an illustration of an example flow diagram of an example process in the multimedia wireless device, carrying out the example operations, in accordance with at least one embodiment of the present invention.

FIG. 5B is an illustration of an example flow diagram 550 of an example process in the multimedia wireless device 102, carrying out the example operations, in accordance with at least one embodiment of the present invention. The steps of the flow diagram represent computer code instructions stored in the RAM and/or ROM memory of the device, which when executed by the central processing units (CPU) 124 and/or 125, carry out the functions of the example embodiments of the invention. The steps may be carried out in another order than shown and individual steps may be combined or separated into component steps. The flow diagram has the following steps:

Step 552: requesting, by an apparatus, pairing with another wireless device to establish a secure relationship with the other device over a first wireless carrier and receiving a device address of the other device associated with the secure relationship over the first wireless carrier;

Step 554: transmitting, by the apparatus, wireless paging messages over a second wireless carrier to the other wireless device, the wireless paging messages being addressed to the other device using the device address associated with the secure relationship received over the first wireless carrier; and Step 556: exchanging, by the apparatus, paging response messages over the second wireless carrier with the other wireless device, and establishing a wireless connection over the second wireless carrier with the other wireless device.

FIG. 6 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable non-transitory media such as resident memory devices, smart cards or other removable memory devices, thereby making a computer program product or article of manufacture according to the embodiments.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
    transmitting, by an apparatus, a connection request including a random device address of the apparatus, to another wireless device over a first wireless carrier and establishing a connection with the other wireless device using the random device address;
    establishing, by the apparatus, pairing with the other wireless device to establish a secure relationship with the other device over the first wireless carrier, wherein establishment of the secure relationship comprises generating one or more encryption keys for link encryption;
    transmitting, by the apparatus, over the first wireless carrier, a device address of the apparatus associated with the paired secure relationship, the device address of the apparatus encrypted under at least one of the one or more encryption keys to provide authentication that it is the device address of the apparatus, to enable the other device to derive from the authenticated device address of the apparatus, an access code configured to access the apparatus over a second wireless carrier, the pairing providing the device address of the apparatus to the other device;

receiving, by the apparatus, wireless paging messages over the second wireless carrier from the other wireless device, the wireless paging messages being addressed to the apparatus with the device access code of the apparatus, wherein the device access code is derived by the other wireless device from the device address transmitted by the apparatus over the first wireless carrier during pairing; and establishing, by the apparatus, a wireless connection over the second wireless carrier with the other wireless device, based on the device access code derived by the other wireless device from the device address transmitted by the apparatus over the first wireless carrier during pairing.

2. The method of claim 1, wherein the device address of the apparatus associated with the secure relationship is a unique address of the apparatus.

3. The method of claim 1, wherein the first wireless carrier is Bluetooth™ Low Energy protocol.

4. The method of claim 3, wherein the device address of the apparatus associated with the secure relationship is a 48-bit Bluetooth™ device address.

5. The method of claim 1, wherein the second wireless carrier is Bluetooth™ basic rate/enhanced data rate protocol and the wireless paging messages are Bluetooth™ basic rate/enhanced data rate paging packets.

6. A method, comprising:

receiving, by an apparatus, a connection request from another wireless device, including a random device address of the other wireless device, over a first wireless carrier and establishing a connection with the other wireless device using the random device address;

establishing, by the apparatus, pairing with the other wireless device to establish a secure relationship with the other device over the first wireless carrier, wherein establishment of the secure relationship comprises generating one or more encryption keys for link encryption;

receiving, by the apparatus, a device address of the other device associated with the paired secure relationship over the first wireless carrier, the device address of the other device encrypted under at least one of the one or more encryption keys to provide authentication of the device address of the other device, the pairing providing the device address of the other device to the apparatus;

deriving, by the apparatus, a device access code from the authenticated device address received over the first wireless carrier during pairing;

transmitting, by the apparatus, wireless paging messages over a second wireless carrier to the other wireless device, the wireless paging messages being addressed to the other device with which the apparatus has established secure relationship, with the device access code derived by the apparatus from the device address received by the apparatus over the first wireless carrier during pairing; and establishing, by the apparatus, a wireless connection over the second wireless carrier with the other wireless device, based on the device access code derived from the device address received by the apparatus over the first wireless carrier during pairing.

7. The method of claim 6, wherein the device address of the other device associated with the secure relationship is a unique address of the other device.

8. The method of claim 6, wherein the first wireless carrier is Bluetooth™ Low Energy protocol.

9. The method of claim 8, wherein the device address of the other device associated with the secure relationship is a 48-bit Bluetooth™ device address.

10. The method of claim 6, wherein the second wireless carrier is Bluetooth™ basic rate/enhanced data rate protocol and the wireless paging messages are Bluetooth™ basic rate/enhanced data rate paging packets.

11. An apparatus, comprising:

at least one processor;

at least one memory including computer program code;

the at least one memory and the computer program code configured to, with the at least one processor, cause the apparatus at least to:

transmit a connection request including a random device address of the apparatus, to another wireless device over a first wireless carrier and establishing a connection with the other wireless device using the random device address;

establish pairing with the other wireless device to establish a secure relationship with the other device over a first wireless carrier, wherein establishment of the secure relationship comprises generating one or more encryption keys for link encryption;

transmit over the first wireless carrier, a device address of the apparatus associated with the paired secure relationship, the device address of the apparatus encrypted under at least one of the one or more encryption keys to provide authentication that it is the device address of the apparatus, to enable the other device to derive from the authenticated device address of the apparatus, an access code configured to access the apparatus over a second wireless carrier, the pairing providing the device address of the apparatus to the other device;

receive wireless paging messages over the second wireless carrier from the other wireless device, the wireless paging messages being addressed to the apparatus with the device access code of the apparatus, wherein the device access code is derived by the other wireless device from the device address transmitted by the apparatus over the first wireless carrier during pairing; and establish a wireless connection over the second wireless carrier with the other wireless device, based on the device access code derived by the other wireless device from the device address transmitted by the apparatus over the first wireless carrier during pairing.

12. The apparatus of claim 11, wherein the device address of the apparatus associated with the secure relationship is a unique address of the apparatus.

13. The apparatus of claim 11, wherein the first wireless carrier is Bluetooth™ Low Energy protocol.

14. The apparatus of claim 13, wherein the device address of the apparatus associated with the secure relationship is a 48-bit Bluetooth™ device address.

15. The apparatus of claim 11, wherein the second wireless carrier is Bluetooth™ basic rate/enhanced data rate protocol and the wireless paging messages are Bluetooth™ basic rate/enhanced data rate paging packets.

16. An apparatus, comprising:

at least one processor;

at least one memory including computer program code;

the at least one memory and the computer program code configured to, with the at least one processor, cause the apparatus at least to:

receive a connection request from another wireless device, including a random device address of the other wireless device, over a first wireless carrier and establish a connection with the other wireless device using the random device address;

establish pairing with the other wireless device to establish a secure relationship with the other device over the first wireless carrier, wherein establishment of the secure relationship comprises generating one or more encryption keys for link encryption;

receive a device address of the other device associated with the paired secure relationship over the first wireless carrier, the device address of the other device encrypted under at least one of the one or more encryption keys to provide authentication of the device address of the other device, the pairing providing the device address of the other device to the apparatus;

derive a device access code from the authenticated device address received over the first wireless carrier during pairing;

transmit wireless paging messages over a second wireless carrier to the other wireless device, the wireless paging messages being addressed to the other device with which the apparatus has established secure relationship, with the device access code derived by the apparatus from the device address received by the apparatus over the first wireless carrier during pairing; and establishing a wireless connection over the second wireless carrier with the other wireless device, based on the device access code derived from the device address received by the apparatus over the first wireless carrier during pairing.

17. The apparatus of claim 16, wherein the device address of the other device associated with the secure relationship is a unique address of the other device.

18. The apparatus of claim 16, wherein the first wireless carrier is Bluetooth™ Low Energy protocol.

19. The apparatus of claim 18, wherein the device address of the other device associated with the secure relationship is a 48-bit Bluetooth™ device address.

20. The apparatus of claim 16, wherein the second wireless carrier is Bluetooth™ basic rate/enhanced data rate protocol and the wireless paging messages are Bluetooth™ basic rate/enhanced data rate paging packets.

21. A non-transitory computer readable medium comprising computer executable program code, the computer executable program code comprising:

code for transmitting, by an apparatus, a connection request including a random device address of the apparatus, to another wireless device over a first wireless carrier and establishing a connection with the other wireless device using the random device address;

code for establishing, by the apparatus, pairing with the other wireless device to establish a secure relationship with the other device over a first wireless carrier, wherein establishment of the secure relationship comprises generating one or more encryption keys for link encryption;

code for transmitting, by the apparatus, over the first wireless carrier, a device address of the apparatus associated with the paired secure relationship, the device address of the apparatus encrypted under at least one of the one or more encryption keys to provide authentication that it is the device address of the apparatus, to enable the other device to derive from the authenticated device address of the apparatus, an access code configured to access the apparatus over a second wireless carrier, the pairing providing the device address of the apparatus to the other device;

code for receiving, by the apparatus, wireless paging messages over the second wireless carrier from the other wireless device, the wireless paging messages being addressed to the apparatus with the device access code of the apparatus, wherein the device access code is derived by the other wireless device from the device address transmitted by the apparatus over the first wireless carrier during pairing; and code for establishing, by the apparatus, a wireless connection over the second wireless carrier with the other wireless device, based on the device access code derived by the other wireless device from the device address transmitted by the apparatus over the first wireless carrier during pairing.

22. A non-transitory computer readable medium comprising computer executable program code, the computer executable program code comprising:

code for receiving, by an apparatus, a connection request from another wireless device, including a random device address of the other wireless device, over a first wireless carrier and establishing a connection with the other wireless device using the random device address;

code for requesting, by the apparatus, pairing with the other wireless device and establishing pairing with the other device to establish a secure relationship with the other device over a first wireless carrier, wherein establishment of the secure relationship comprises generating one or more encryption keys for link encryption;

code for receiving, by the apparatus, a device address of the other device associated with the paired secure relationship over the first wireless carrier, the device address of the other device encrypted under at least one of the one or more encryption keys to provide authentication of the device address of the other device, the pairing providing the device address of the other device to the apparatus;

code for deriving, by the apparatus, a device access code from the authenticated device address received over the first wireless carrier during pairing;

code for transmitting, by the apparatus, wireless paging messages over a second wireless carrier to the other wireless device, the wireless paging messages being addressed to the other device with which the apparatus has established secure relationship, with the device access code derived by the apparatus from the device address received by the apparatus over the first wireless carrier during pairing; and code for establishing, by the apparatus, a wireless connection over the second wireless carrier with the other wireless device, based on the device access code derived from the device address received by the apparatus over the first wireless carrier during pairing.

* * * * *